US012477912B2

(12) United States Patent
Chu et al.

(10) Patent No.: US 12,477,912 B2
(45) Date of Patent: Nov. 18, 2025

(54) DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Zhiwen Chu, Beijing (CN); Bo Zhang, Beijing (CN); Yi Qu, Beijing (CN); Xinxin Wang, Beijing (CN); Aoyuan Feng, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/791,910

(22) PCT Filed: Aug. 31, 2021

(86) PCT No.: PCT/CN2021/115792
§ 371 (c)(1),
(2) Date: Jul. 11, 2022

(87) PCT Pub. No.: WO2023/028875
PCT Pub. Date: Mar. 9, 2023

(65) Prior Publication Data
US 2024/0206269 A1 Jun. 20, 2024

(51) Int. Cl.
*H10K 59/131* (2023.01)
*H10K 59/13* (2023.01)
*H10K 59/88* (2023.01)

(52) U.S. Cl.
CPC ....... *H10K 59/1315* (2023.02); *H10K 59/131* (2023.02); *H10K 59/88* (2023.02); *H10K 59/13* (2023.02)

(58) Field of Classification Search
CPC .. H10K 59/1315; H10K 59/131; H10K 59/88; H10K 59/13; G06F 1/16; G09F 9/30; H04M 1/02
See application file for complete search history.

(56) References Cited

U.S. PATENT DOCUMENTS

2016/0270234 A1 9/2016 Ahn
2017/0242457 A1 8/2017 Lee et al.
(Continued)

FOREIGN PATENT DOCUMENTS

CN 105979696 A 9/2016
CN 107102762 A 8/2017
(Continued)

*Primary Examiner* — Steven B Gauthier
*Assistant Examiner* — Alvin L Lee
(74) *Attorney, Agent, or Firm* — Ling Wu; Stephen Yang; Ling and Yang Intellectual Property

(57) ABSTRACT

Disclosed are a display panel and a display apparatus. The display panel includes a display region and a bonding region located on one side of the display region in a first direction; the display region includes multiple sub-pixels arranged in an array and multiple data lines electrically connected with the multiple sub-pixels; the bonding region includes multiple data line leads connected with the multiple data lines and multiple pins connected with the multiple data line leads, the multiple pins are located on one side of the multiple data line leads away from the display region; the bonding region further includes a first wiring region, a bending region, and a second wiring region disposed in sequence along the first direction, the second wiring region includes a first through hole located between the multiple data line leads, and the first through hole is configured to correspond to a first photosensitive element.

17 Claims, 11 Drawing Sheets

(56) References Cited

U.S. PATENT DOCUMENTS

2020/0175917 A1    6/2020  Jo et al.
2020/0401197 A1*  12/2020  Asada ................... H05K 1/118
2021/0074800 A1*   3/2021  Nakagawa ............. H05B 33/06

FOREIGN PATENT DOCUMENTS

| CN | 108666356 A |   | 10/2018 |         |           |
|----|-------------|---|---------|---------|-----------|
| CN | 110377113 A | * | 10/2019 | ........ | H04M 1/0264 |
| CN | 209860963 U |   | 12/2019 |         |           |
| CN | 111261669 A |   |  6/2020 |         |           |
| CN | 112287804 A |   |  1/2021 |         |           |

* cited by examiner

DISPLAY PANEL AND DISPLAY APPARATUS

CROSS-REFERENCE TO RELATED APPLICATION

The present application is a U.S. National Phase Entry of International Application No. PCT/CN2021/115792 having an international filing date of Aug. 31, 2021. The entire contents of the above-identified application are hereby incorporated by reference.

TECHNICAL FIELD

Embodiments of the present disclosure relate to, but are not limited to, the field of display technologies, and particularly to a display panel and a display apparatus.

BACKGROUND

An Organic Light Emitting Diode (OLED) is an active light emitting display device, and has advantages of self-illumination, a wide viewing angle, a high contrast ratio, low power consumption, an extremely high response speed, etc. With continuous development of display technologies, a bendable flexible display apparatus with an OLED as a light emitting device and a Thin Film Transistor (TFT) for performing signal controlling has become a mainstream product in the current display field.

SUMMARY

The following is a summary of subject matters described herein in detail. The summary is not intended to limit the protection scope of claims.

In one aspect, an embodiment of the present disclosure provides a display panel, including: a display region and a bonding region located on one side of the display region in a first direction; wherein the display region includes multiple sub-pixels arranged in an array and multiple data lines electrically connected with the multiple sub-pixels; the bonding region includes multiple data line leads connected with the multiple data lines and multiple pins connected with the multiple data line leads, the multiple pins are located on one side of the multiple data line leads away from the display region; wherein the bonding region further includes a first wiring region, a bending region, and a second wiring region disposed in sequence along the first direction, the second wiring region includes a first through hole, the first through hole is located between the multiple data line leads, and the first through hole is configured to correspond to a first photosensitive element.

In another aspect, an embodiment of the present disclosure also provides a display apparatus, which includes the display panel in the above embodiment and a first photosensitive element, wherein a disposing position of the first photosensitive element corresponds to a disposing position of a first through hole.

Other features and advantages of the present disclosure will be set forth in the following specification, and moreover, will partially be apparent from the specification, or will be understood by implementing the present disclosure. Other advantages of the present disclosure may be achieved and obtained through solutions described in the specification and drawings.

After reading and understanding the drawings and detailed description, other aspects may be understood.

BRIEF DESCRIPTION OF DRAWINGS

The drawings are used for providing understanding of technical solutions of the present disclosure, constitute a part of the specification, and together with the embodiments of the present disclosure, are used for explaining the technical solutions of the present disclosure, but do not constitute a limitation on the technical solutions of the present disclosure. A shape and a size of each component in the drawings do not reflect actual scales, and are only intended to schematically illustrate contents of the present disclosure.

DETAILED DESCRIPTION

Figure 1A:
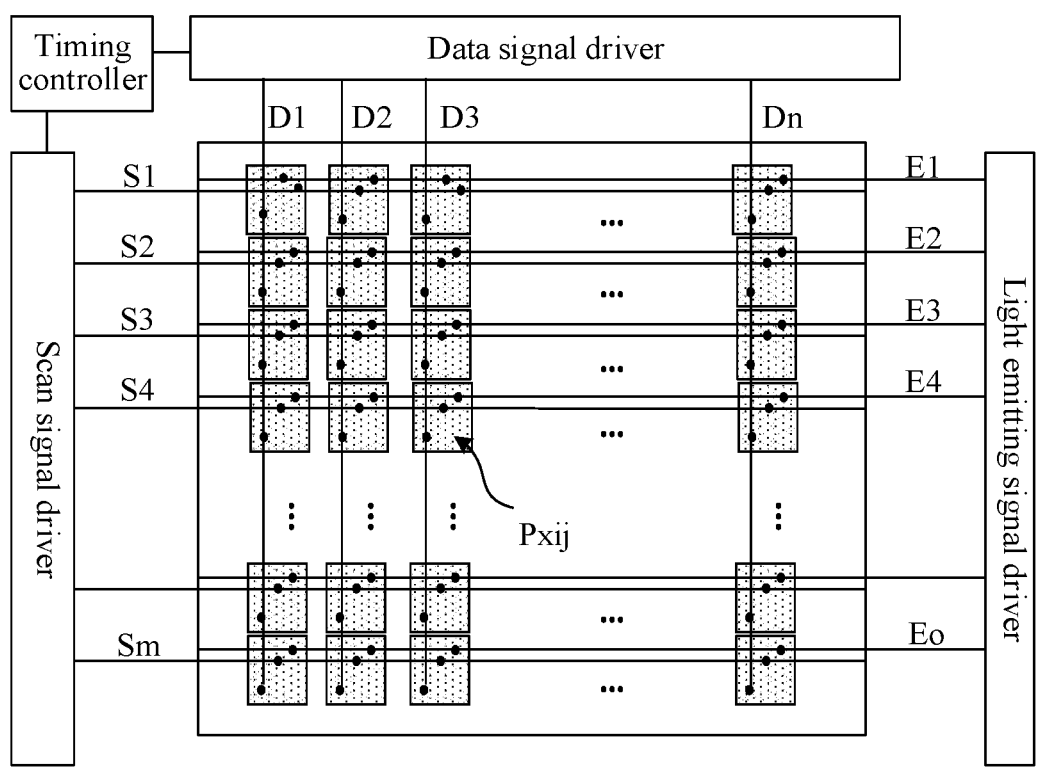
FIG. 1A is a schematic diagram of a structure of an OLED display apparatus.

Various embodiments are described herein, but the description is exemplary rather than restrictive, and more embodiments and implementation solutions are possible within a scope contained in the embodiments described herein. Although many possible feature combinations are shown in the drawings and discussed in exemplary implementation modes, many other combinations of the disclosed features are possible. Unless expressly limited, any feature or element of any embodiment may be used in combination with, or may replace, any other feature or element in any other embodiment.

When a representative embodiment is described, a method or process may already be presented in a specific sequence of acts in the specification. However, to an extent that the method or process does not depend on the specific sequence of the acts herein, the method or process should not be limited to the acts in the specific sequence. As will be understood by those of ordinary skill in the art, other sequences of acts are possible. Therefore, the specific sequence of the acts illustrated in the specification should not be interpreted as a limitation on claims. In addition, the claims with respect to the method or process should not be limited to acts performed in sequences written. Those skilled in the art may easily understand that these sequences may be changed, and are still maintained in the spirit and scope of the embodiments of the present disclosure.

In the drawings, a size of each constituent element, a thickness of a layer, or a region is exaggerated sometimes for clarity. Therefore, one mode of the present disclosure is not necessarily limited to the size, and a shape and a size of each component in the drawings do not reflect true proportions. In addition, the drawings schematically illustrate ideal examples, and one mode of the present disclosure is not limited to shapes, numerical values, or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element has a particular orientation and is structured and operated in the particular orientation. Therefore, they cannot be understood as a limitation on the present disclosure. The positional relationships between the constituent elements may be changed appropriately according to a direction in which each constituent element is described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two elements. Those of ordinary skills in the art may understand meanings of the aforementioned terms in the present disclosure according to situations.

In the specification, the "electrical connection" includes a case that constituent elements are connected together through an element with some electrical action. The "element with some electrical action" is not particularly limited as long as electrical signals may be sent and received between the connected constituent elements. For example, the "elements with some electrical action" may be, for example, electrodes or wirings, or switch elements such as transistors, or other functional elements such as resistors, inductors, and capacitors.

In the specification, a transistor refers to an element that at least includes three terminals, i.e., a gate electrode (gate or control electrode), a drain electrode (drain electrode terminal, drain region, or drain), and a source electrode (source electrode terminal, source region, or source). A transistor has a channel region between a drain electrode and a source electrode, and a current can flow through the drain electrode, the channel region, and the source electrode. It is to be noted that, in the specification, the channel region refers to a region through which the current mainly flows.

In the specification, in order to distinguish two electrodes of a transistor other than a gate electrode (gate electrode or control electrode), one of the two electrodes is directly described as a first electrode, while the other is described as a second electrode. The first electrode may be a drain electrode, and the second electrode may be a source electrode. Or, the first electrode may be a source electrode, and the second electrode may be a drain electrode. In cases that transistors with opposite polarities are used, a direction of a current is changed during operation of a circuit, or the like, functions of the "source electrode" and the "drain electrode" are sometimes interchangeable. Therefore, the "source electrode" and the "drain electrode" are interchangeable in the specification.

Transistors in the embodiments of the present disclosure may be Thin Film Transistors (TFTs), or Field Effect Transistors (FETs), or other devices with same characteristics. For example, a thin film transistor used in the embodiments of the present disclosure may include, but is not limited to, an oxide TFT or a Low Temperature Poly-silicon TFT (LTPS TFT). Here, no limit is made thereto in the embodiment of the present disclosure.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the present disclosure, "about" refers to that a boundary is defined not so strictly and numerical values within process and measurement error ranges are allowed.

With continuous development of display technologies, a form of a display apparatus (such as mobile phone) is changed rapidly, and many flexible display apparatuses (such as foldable display apparatuses) appear in markets, which are favored by consumers. Current flexible display apparatuses usually have photosensitive elements (for example, fingerprint recognition sensors, camera components, or infrared sensors, etc.), which are not conducive to achieve a full screen in order to match installation of a whole machine.

FIG. 1A is a schematic diagram of a structure of an OLED display apparatus. As shown in FIG. 1A, the OLED display apparatus may include a timing controller, a data driver, a scan driver, a light emitting driver, and a pixel array. The timing controller is connected with the data driver, the scan driver, and the light emitting driver respectively, the data driver is connected with multiple data signal lines (D1 to Dn) respectively, the scan driver is connected with multiple scan signal lines (S1 to Sm) respectively, and the light emitting driver is connected with multiple light emitting signal lines (E1 to Eo) respectively. The pixel array may include multiple sub-pixels Pxij, wherein i and j may be natural numbers, at least one sub-pixel Pxij may include a circuit unit and a light emitting device connected with the circuit unit, and the circuit unit may include at least one scan signal line (also referred to as a gate line), at least one data signal line (also referred to as a data line), at least one light emitting signal line, and a pixel drive circuit. In an exemplary embodiment, the timing controller may provide a gray-scale value and a controlling signal, which are suitable for a specification of the data driver, to the data driver; provide a clock signal, a scan starting signal, and the like, which are suitable for a specification of the scan driver, to the scan driver; and provide a clock signal, a light emitting stopping signal, and the like, which are suitable for a specification of the light emitting driver, to the light emitting driver. The data driver may generate a data voltage to be provided to data signal lines D1, D2, D3, ..., and Dn by using the gray-scale value and the controlling signal received from the timing controller. For example, the data driver may sample the gray-scale value by using the clock signal, and apply a data voltage corresponding to the gray-scale value to the data signal lines D1 to Dn by taking a pixel row as a unit, wherein n may be a natural number. The scan driver may generate a scan signal to be provided to scan signal lines S1, S2, S3, ..., and Sm by receiving a clock signal, a scan starting signal, and the like, from the timing controller. For example, the scan driver may provide sequentially a scan signal with a turn-on level pulse to the scan signal lines S1 to Sm. For example, the scan driver may be constructed in a form of a shift register, and may generate a scan signal in a mode of transmitting sequentially the scan starting signal provided in a form of a turn-on level pulse to a next-stage circuit under control of the clock signal, wherein m may be a natural number. The light emitting driver may generate a light emitting signal to be provided to light emitting signal lines E1, E2, E3, ..., and Eo, by receiving a clock signal, a light emitting stopping signal, and the like, from the timing controller. For example, the light emitting driver may provide sequentially an emitting signal with a turn-off level pulse to the light emitting signal lines E1 to Eo. For example, the light emitting driver may be constructed in a form of a shift register, and may generate an emitting signal in a mode of transmitting sequentially n emitting stopping signal provided in a form of a turn-off level pulse to a next-stage circuit under control of the clock signal, wherein o may be a natural number.

In an exemplary embodiment, the pixel drive circuit may include, but is not limited to, a structure of 3T1C, 4T1C, 5T1C, 5T2C, 6T1C, or 7T1C, etc. Here, no limit is made thereto in the embodiment of the present disclosure.

Figure 1B:
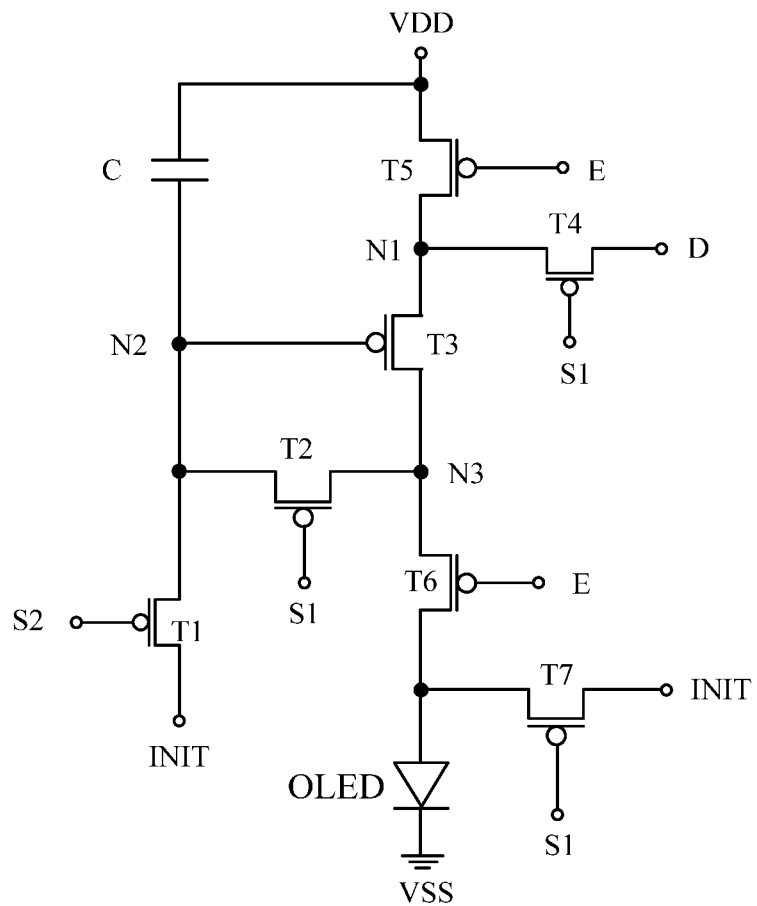
FIG. 1B is a schematic diagram of an equivalent circuit of a pixel drive circuit.

FIG. 1B is a schematic diagram of an equivalent circuit of a pixel drive circuit. As shown in FIG. 1B, the pixel drive circuit may include seven transistors (a first transistor T1 to a seventh transistor T7), one storage capacitor C, and seven signal lines (a data signal line D, a first scan signal line S1, a second scan signal line S2, a light emitting signal line E, an initial signal line INIT, a first power supply line VDD, and a second power supply line VSS).

In an exemplary embodiment, the pixel drive circuit may include a first node N1, a second node N2, and a third node N3. Herein, the first node N1 is respectively connected with a first electrode of the third transistor T3, a second electrode of the fourth transistor T4, and a second electrode of the fifth transistor T5, the second node N2 is respectively connected with a second electrode of the first transistor, a first electrode of the second transistor T2, a control electrode of the third transistor T3, and a second end of the storage capacitor C, and the third node N3 is respectively connected with a second electrode of the second transistor T2, a second electrode of the third transistor T3, and a first electrode of the sixth transistor T6.

In an exemplary embodiment, a first end of the storage capacitor C is connected with the first power supply line VDD, and a second end of the storage capacitor C is connected with the second node N2, namely the second end of the storage capacitor C is connected with a control electrode of the third transistor T3.

A control electrode of the first transistor T1 is connected with the second scan signal line S2, a first electrode of the first transistor T1 is connected with the initial signal line INIT, and the second electrode of the first transistor is connected with the second node N2. When a scan signal with a turn-on level is applied to the second scan signal line S2, the first transistor T1 transmits an initialization voltage to the control electrode of the third transistor T3 so as to initialize a charge amount of the control electrode of the third transistor T3.

A control electrode of the second transistor T2 is connected with the first scan signal line S1, the first electrode of the second transistor T2 is connected with the second node N2, and the second electrode of the second transistor T2 is connected with the third node N3. When a scan signal with a turn-on level is applied to the first scan signal line S1, the second transistor T2 enables the control electrode of the third transistor T3 to be connected with a second electrode of the third transistor T3.

The control electrode of the third transistor T3 is connected with the second node N2, namely the control electrode of the third transistor T3 is connected with the second end of the storage capacitor C, a first electrode of the third transistor T3 is connected with the first node N1, and the second electrode of the third transistor T3 is connected with the third node N3. The third transistor T3 may be referred to as a drive transistor, and the third transistor T3 determines an amount of a drive current flowing between the first power supply line VDD and the second power supply line VSS according to a potential difference between the control electrode and the first electrode of the third transistor T3.

A control electrode of the fourth transistor T4 is connected with the first scan signal line S1, a first electrode of the fourth transistor T4 is connected with the data signal line D, and a second electrode of the fourth transistor T4 is connected with the first node N1. The fourth transistor T4 may be referred to as a switch transistor, a scan transistor, etc., and when a scan signal with a turn-on level is applied to the first scan signal line S1, the fourth transistor T4 enables a data voltage of the data signal line D to be input to the pixel drive circuit.

A control electrode of the fifth transistor T5 is connected with the light emitting signal line E, a first electrode of the fifth transistor T5 is connected with the first power supply line VDD, and a second electrode of the fifth transistor T5 is connected with the first node N1. A control electrode of the sixth transistor T6 is connected with the light emitting signal line E, a first electrode of the sixth transistor T6 is connected with the third node N3, and a second electrode of the sixth transistor T6 is connected with a first electrode of a light emitting device. The fifth transistor T5 and the sixth transistor T6 may be referred to as light emitting transistors. When a light emitting signal with a turn-on level is applied to the light emitting signal line E, the fifth transistor T5 and the sixth transistor T6 enable the light emitting device to emit light by forming a drive current path between the first power supply line VDD and the second power supply line VSS.

A control electrode of the seventh transistor T7 is connected with the first scan signal line S1, a first electrode of the seventh transistor T7 is connected with the initial signal line INIT, and a second electrode of the seventh transistor T7 is connected with the first electrode of the light emitting device. When a scan signal with a turn-on level is applied to the first scan signal line S1, the seventh transistor T7 transmits an initialization voltage to the first electrode of the light emitting device so as to initialize a charge amount accumulated in the first electrode of the light emitting device or release a charge amount accumulated in the first electrode of the light emitting device.

In an exemplary embodiment, a second electrode of the light emitting device is connected with the second power supply line VSS, a signal of the second power supply line VSS is a low-level signal, and a signal of the first power supply line VDD is a high-level signal continuously provided. The first scan signal line S1 is a scan signal line in a pixel drive circuit of a current display row, and the second scan signal line S2 is a scan signal line in a pixel drive circuit of a previous display row. That is, for an n-th display row, the first scan signal line S1 is S(n), and the second scan signal line S2 is S(n−1). A second scan signal line S2 of the current display row and a first scan signal line S1 in the pixel drive circuit of the previous display row are a same signal line, thus signal lines of the display panel may be reduced, so that a narrow bezel of the display panel is achieved In an exemplary embodiment, the first transistor T1 to the seventh transistor T7 may be P-type transistors, or may be N-type transistors. Use of a same type of transistors in a pixel drive circuit may simplify a process flow, reduce process difficulties of the display panel, and improve a product yield. In some possible implementation modes, the first transistor T1 to the seventh transistor T7 may include a P-type transistor and an N-type transistor.

In an exemplary embodiment, the first scan signal line S1, the second scan signal line S2, the light emitting signal line E, and the initial signal line INIT may extend along a horizontal direction, and the second power supply line VSS, the first power supply line VDD, and the data signal line D may extend along a vertical direction.

In an exemplary embodiment, the light emitting device may be an organic electroluminescent diode (OLED), including a first electrode (for example, as an anode), an organic emitting layer, and a second electrode (for example, as a cathode) that are stacked.

Figure 1C:
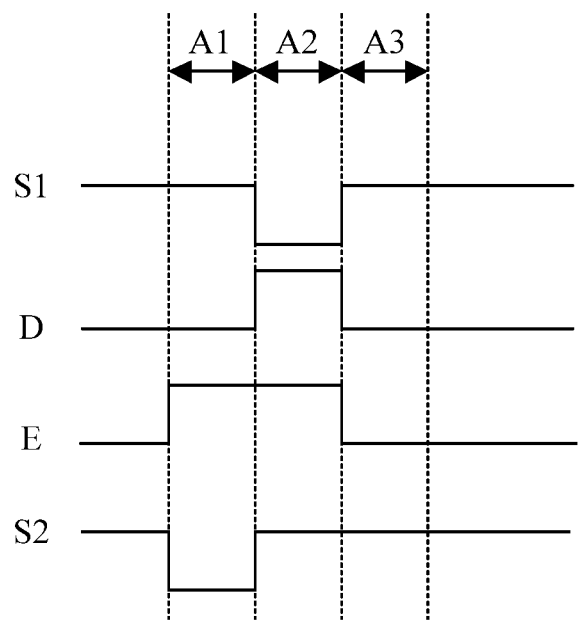
FIG. 1C is a working timing diagram of a pixel drive circuit.

FIG. 1C is a working timing diagram of a pixel drive circuit. An exemplary embodiment of the present disclosure will be described below through a working process of the pixel drive circuit shown in FIG. 1B. The pixel drive circuit in FIG. 1B includes seven transistors (a first transistor T1 to a seventh transistor T7), one storage capacitor C, and seven signal lines (a data signal line D, a first scan signal line S1, a second scan signal line S2, a light emitting signal line E, an initial signal line INIT, a first power supply line VDD, and a second power supply line VSS), wherein the seven transistors are all P-type transistors.

In an exemplary embodiment, a working process of the pixel drive circuit may include following stages.

In a first stage A1, referred to as a reset stage, a signal of the second scan signal line S2 is a low-level signal, and signals of the first scan signal line S1 and the light emitting signal line E are high-level signals. The signal of the second scan signal line S2 is the low-level signal, so that the first transistor T1 is turned on, and a signal of the initial signal line INIT is provided to a second node N2 to initialize the storage capacitor C to clear an original data voltage in the storage capacitor. The signals of the first scan signal line S1 and the light emitting signal line E are high-level signals, so that the second transistor T2, the fourth transistor T4, the fifth transistor T5, the sixth transistor T6, and the seventh transistor T7 are turned off. An OLED does not emit light in this stage.

In a second stage A2, referred to as a data writing stage or a threshold compensation stage, a signal of the first scan signal line S1 is a low-level signal, signals of the second scan signal line S2 and the light emitting signal line E are high-level signals, and the data signal line D outputs a data voltage. In this stage, a second end of the storage capacitor C is at a low level, so the third transistor T3 is turned on. The signal of the first scan signal line S1 is the low-level signal, so that the second transistor T2, the fourth transistor T4, and the seventh transistor T7 are turned on. The second transistor T2 and the fourth transistor T4 are turned on, so that the data voltage outputted by the data signal line D is provided to the second node N2 through a first node N1, the turned-on third transistor T3, a third node N3, and the turned-on second transistor T2, and the storage capacitor C is charged with a difference between the data voltage outputted by the data signal line D and a threshold voltage of the third transistor T3. A voltage at the second end (the second node N2) of the storage capacitor C is Vd−|Vth|, wherein Vd is the data voltage outputted by the data signal line D, and Vth is the threshold voltage of the third transistor T3. The seventh transistor T7 is turned on, so that an initialization voltage of the initial signal line INIT is provided to a first electrode of the OLED to initialize (reset) the first electrode of the OLED and clear a pre-stored voltage therein, thereby completing initialization to ensure that the OLED does not emit light. A signal of the second scan signal line S2 is a high-level signal, so that the first transistor T1 is turned off. A signal of the light emitting signal line E is a high-level signal, so that the fifth transistor T5 and the sixth transistor T6 are turned off.

In a third stage A3, referred to as a light emitting stage, a signal of the light emitting signal line E is a low-level signal, and signals of the first scan signal line S1 and the second scan signal line S2 are high-level signals. The signal of the light emitting signal line E is the low-level signal, so that the fifth transistor T5 and the sixth transistor T6 are turned on, and a power voltage outputted by the first power supply line VDD provides a drive voltage to the first electrode of the OLED through the turned-on fifth transistor T5, the third transistor T3, and the sixth transistor T6 to drive the OLED to emit light.

In a drive process of the pixel drive circuit, a drive current flowing through the third transistor T3 (drive transistor) is determined by a voltage difference between a gate electrode and a first electrode of the third transistor T3. A voltage of the second node N2 is Vdata−|Vth|, so that the drive current of the third transistor T3 is as follows.

$$I = K*(Vgs-Vth)^2 = K*[(Vdd-Vd+|Vth|)-Vth]^2 = K*[(Vdd-Vd]^2$$

Herein, I is the drive current flowing through the third transistor T3, i.e., a drive current for driving the OLED, K is a constant, Vgs is the voltage difference between the gate electrode and the first electrode of the third transistor T3, Vth is the threshold voltage of the third transistor T3, Vd is the data voltage outputted by the data signal line D, and Vdd is the power voltage outputted by the first power supply line VDD.

In an embodiment of the present disclosure, a first direction DR1 may refer to a vertical direction, a second direction DR2 may refer to a horizontal direction, and a third direction DR3 may refer to a thickness direction of a display panel, or a direction perpendicular to a plane of a display panel, etc. Herein, the first direction DR1 intersects with the second direction DR2, and the first direction DR1 intersects with the third direction DR3. For example, the first direction DR1 and the second direction DR2 may be perpendicular to each other, and the first direction DR1 and the third direction DR3 may be perpendicular to each other.

An embodiment of the present disclosure provides a display panel, wherein the display panel may include: a display region and a bonding region located on one side of a first direction of the display region; the display region may include multiple sub-pixels arranged in an array and multiple data lines electrically connected with the multiple sub-pixels; the bonding region includes multiple data line leads connected with the multiple data lines and multiple pins connected with the multiple data line leads, wherein the multiple pins are located on one side of the multiple data line leads away from the display region; herein, the bonding region may further include a first wiring region, a bending region, and a second wiring region disposed in sequence along the first direction, wherein the second wiring region may include a first through hole, the first through hole is located between the multiple data line leads, and the first through hole is configured to correspond to a first photosensitive element. Thus, the first photosensitive element (for example, a camera component) is avoided by digging a hole in the bonding region of the display panel, which is convenient for matching installation of a whole machine and is beneficial for achieving a full screen.

In an exemplary embodiment, the second wiring region may include a first sub-region, and the first through hole is located in the first sub-region; the second wiring region has a center line extending along the first direction, and the first through hole is symmetrically disposed about the center line. Thus, uniformity of loading of wirings around the first through hole in the second wiring region may be ensured, so that impedances of wirings on the display panel may be ensured to be consistent, and a wiring pressure caused by a centralized distribution of wirings on one side may be avoided. Therefore, a display effect may be improved.

In an exemplary embodiment, the second wiring region may further include a second through hole, located on one side of the first through hole along a second direction, wherein the second through hole is configured to correspond to a second photosensitive element, and the second direction intersects with the first direction.

In an exemplary embodiment, the second wiring region may further include a dummy hole, located on one side of the second through hole away from the first through hole along the second direction, and the first sub-region may include a first hole region, a second hole region, and a third hole region arranged in sequence along the second direction, wherein the first through hole is located in the second hole region, the second through hole is located in the first hole region, and the dummy hole is located in the third hole region.

In an exemplary embodiment, a shape of the dummy hole is the same as a shape of the second through hole, and a size of the second through hole is the same as a size of the dummy hole.

In an exemplary embodiment, the dummy hole and the second through hole may be disposed symmetrically with respect to the center line, and the second direction intersects with the first direction. Thus, a through hole is opened in the bonding region of the display panel, the second through hole and the dummy hole are disposed symmetrically with respect to the center line, and the first through hole is disposed symmetrically with respect to the center line, which may ensure the uniformity of the loading of the wirings in the second wiring region, so that consistency of the impedances of the wirings on the display panel may be ensured, and the wiring pressure caused by the centralized distribution of the wirings on one side may be avoided. Therefore, the display effect may be improved.

In an exemplary embodiment, the first hole region may further include: multiple first wirings extending along the first direction and multiple second wirings extending along the first direction, wherein the multiple first wirings and the multiple second wirings are respectively located on two sides of the second through hole along the second direction, a length of a first wiring is larger than a length of a second wiring, and a width of the first wiring is larger than a width of the second wiring. Thus, by setting a width of a relatively long wiring (e.g., the first wiring) among wirings on two sides of the second through hole to be relatively wide, and setting a width of a relatively short wiring (e.g., the second wiring) to be relatively thin, an overall resistance of the relatively long wiring (e.g., the first wiring) may be reduced, so that loading of the relatively longer wiring (e.g., the first wiring) may be reduced, ensuring that resistances of the wirings on two sides of the first through hole vary uniformly and loading is relatively balanced.

In an exemplary embodiment, the third hole region may further include: multiple third wirings extending along the first direction and multiple fourth wirings extending along the first direction, the multiple third wirings and the multiple fourth wirings are respectively located on two sides of the dummy hole, a length of a third wiring is larger than a length of a fourth wiring, a width of the third wiring is larger than a width of the fourth wiring, the third wiring and the first wiring are symmetrically disposed with respect to the center line, and the fourth wiring and the second wiring are symmetrically disposed with respect to the center line. Thus, by setting a width of a relatively long wiring (e.g., the third wiring) among wirings on two sides of the dummy hole to be relatively wide, and setting a width of a relatively short wiring (e.g., the fourth wiring) to be relatively thin, an overall resistance of the relatively long wiring (e.g., the third wiring) may be reduced, so that loading of the relatively long wiring (e.g., the third wiring) may be reduced, ensuring that resistances of the wirings on two sides of the dummy hole vary uniformly and loading is relatively balanced. Moreover, since the third wiring and the first wiring are symmetrically disposed with respect to the center line, and the fourth wiring and the second wiring are symmetrically disposed with respect to the center line, it may be ensured that resistances of wirings in the second wiring region vary uniformly.

In an exemplary embodiment, the display panel may further include: a second sub-region and a third sub-region located on two sides of the first sub-region along the second direction, wherein the second sub-region and the third sub-region may be disposed symmetrically with respect to the center line. Thus, by setting the second sub-region and the third sub-region, uniformity of loading of wirings of the second wiring region may be ensured. Therefore, impedances of wirings on the display panel may be ensured to be consistent, and a wiring pressure caused by a centralized distribution of wirings on one side may be avoided. Therefore, a display effect may be improved.

In an exemplary embodiment, the display panel may further include a dummy wiring, wherein the dummy wiring includes at least one of a first dummy wiring around the first through hole and a second dummy wiring around the second through hole. Thus, by setting a dummy wiring around a through hole, a risk of a bad crack around the through hole may be reduced during a punching process in a process of preparing the display panel, an adverse effect on a normal wiring around the through hole may be avoided, and a product yield may be improved.

Figure 2:
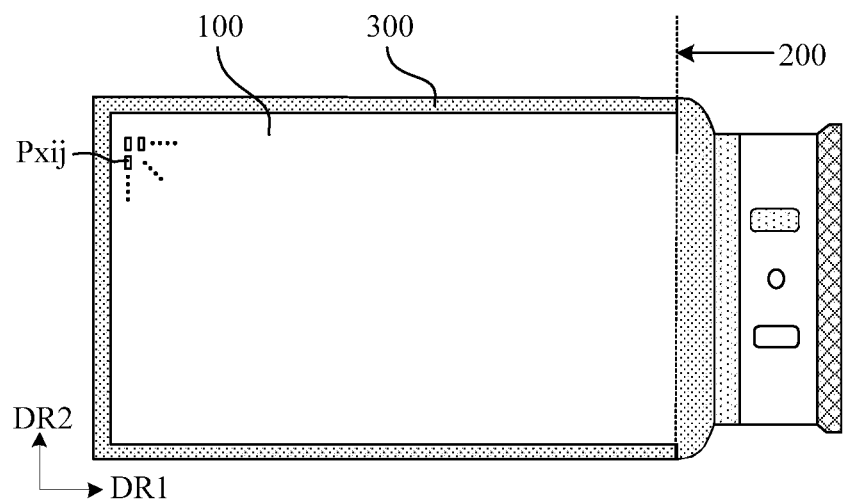
FIG. 2 is a schematic diagram of a structure of a display panel in an exemplary embodiment of the present disclosure.

FIG. 2 is a schematic diagram of a structure of a display panel in an exemplary embodiment of the present disclosure. As shown in FIG. 2, the display panel may include a display region 100 and a non-display region located at a periphery of the display region 100, wherein the non-display region may include: a bonding region 200 located on one side of the display region 100 and a frame region 300 located on another side of the display region 100. For example, the bonding region 200 may be located on one side of the display region 100 in a first direction DR1.

In an exemplary embodiment, as shown in FIG. 2, the display region 100 may include multiple sub-pixels Pxij arranged in an array and multiple data lines (not shown in the figure) electrically connected with the multiple sub-pixels Pxij, wherein i and j may be natural numbers. For example, the display region 100 may further include multiple gate lines electrically connected with the multiple sub-pixels Pxij. Herein, a sub-pixel Pxij may refer to a sub-pixel in which a transistor is connected to an ith gate line and a jth data line.

The display region will be described below with reference to the drawings.

Figure 3A:
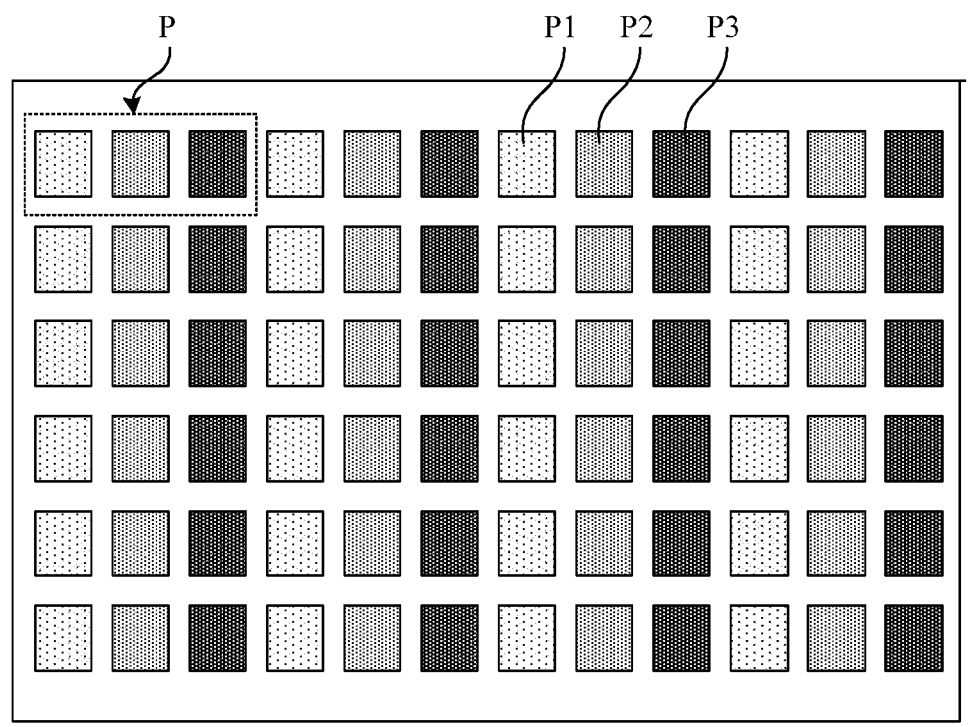
FIG. 3A is a schematic diagram of a structure of a display region in a display panel in an exemplary embodiment of the present disclosure.

FIG. 3A is a schematic diagram of a structure of a display region in a display panel in an exemplary embodiment of the present disclosure. As shown in FIG. 3A, in an exemplary embodiment, a display region 100 may include multiple pixel units P arranged in a matrix mode, at least one of the multiple pixel units P may include a first sub-pixel P1 that emits light of a first color, a second sub-pixel P2 that emits light of a second color, and a third sub-pixel P3 that emits light of a third color. For example, the first sub-pixel P1 may be a red (R) sub-pixel, the second sub-pixel P2 may be a green (G) sub-pixel, and the third sub-pixel P3 may be a blue (B) sub-pixel. Or, at least one of the multiple pixel units P may include a first sub-pixel P1, a second sub-pixel P2, a third sub-pixel P3, and a fourth sub-pixel P4 that emit light of different colors. For example, a pixel unit P may include four sub-pixels, such as a red sub-pixel, a green sub-pixel, a blue sub-pixel, and a white sub-pixel. Here, no limit is made thereto in the embodiment of the present disclosure.

In an exemplary embodiment, each sub-pixel may include: a pixel drive circuit and a light emitting device. Herein, the pixel drive circuit in the sub-pixel is respectively connected with a scan signal line, a data signal line, and a light emitting signal line, the light emitting device in the sub-pixel is respectively connected with the pixel drive circuit of the sub-pixel in which the light emitting device is located, the pixel drive circuit is configured to, under control of the scan signal line and the light emitting signal line, receive a data voltage transmitted by the data signal line and output a corresponding current to the light emitting device, and the light emitting device is configured to emit light with a corresponding brightness in response to the current outputted by the pixel drive circuit of the sub-pixel in which the light emitting device is located.

In an exemplary embodiment, the multiple sub-pixels in the pixel unit may be arranged in a manner to stand side by side horizontally, in a manner to stand side by side vertically, in a shape of an X, in a manner like a Chinese character "十", in a manner like a Chinese character "品", or the like. For example, taking a pixel unit including three sub-pixels as an example, the three sub-pixels may be arranged in a manner to stand side by side horizontally, in a manner to stand side by side vertically, in a manner like a Chinese character "品", or the like. For example, taking a pixel unit including four sub-pixels as an example, the four sub-pixels may be arranged in a manner to stand side by side horizontally, in a manner to stand side by side vertically, in a manner to form a square, or the like. Here, no limit is made thereto in the embodiment of the present disclosure.

In an exemplary embodiment, a shape of a sub-pixel may be any one or more of a triangle, a square, a rectangle, a rhombus, a trapezoid, a parallelogram, a pentagon, a hexagon, or another polygon. Here, no limit is made thereto in the embodiment of the present disclosure.

Figure 3B:
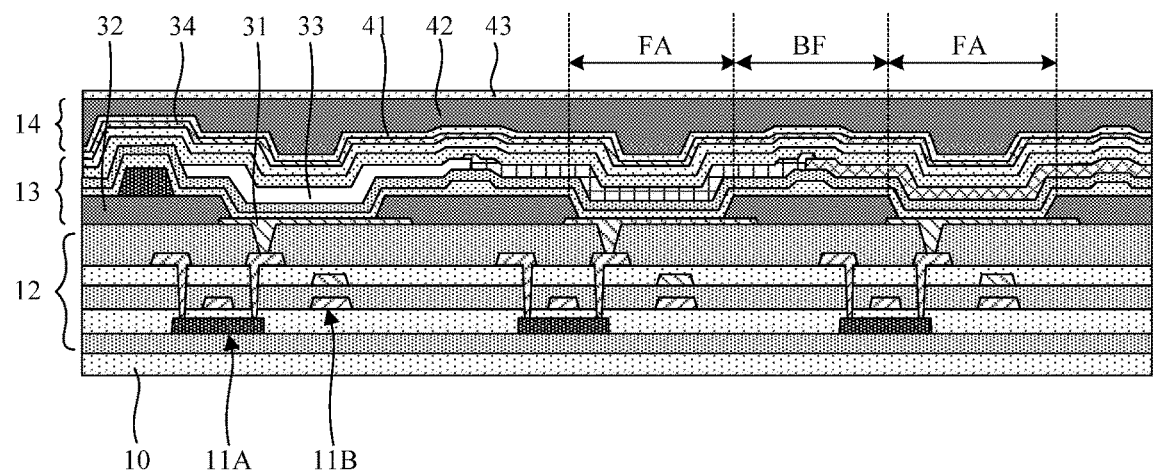
FIG. 3B is a schematic diagram of another structure of a display region in a display panel in an exemplary embodiment of the present disclosure.

FIG. 3B is a schematic diagram of another structure of a display region in a display panel in an exemplary embodiment of the present disclosure, and shows a structure of three sub-pixels in an OLED display panel. As shown in FIG. 3B, in an exemplary embodiment, on a plane perpendicular to the display panel, the display panel may include a drive circuit layer 12 disposed on a base substrate 10, a light emitting structure layer 13 disposed on one side of the drive circuit layer 12 away from the base substrate 10, and an encapsulation layer 14 disposed on one side of the light emitting structure layer 13 away from the base substrate 10. In some possible implementation modes, the display panel may include another film layer, such as a post spacer, which is not limited here in the present disclosure.

In an exemplary embodiment, the base substrate 10 may be a flexible base substrate, or may be a rigid base substrate. The drive circuit layer 12 of each sub-pixel may include multiple transistors and a storage capacitor that form a pixel drive circuit. FIG. 3B shows only one transistor 11A and one storage capacitor 11B as an example. The light emitting structure layer 13 may include an anode 31, a pixel definition layer 32, an organic emitting layer 33, and a cathode 34, wherein the anode 31 is connected with a drain electrode of the transistor 11A through a via, the pixel definition layer 32 covers the anode 31 and is provided with a pixel opening exposing the anode 31, the organic emitting layer 33 is connected with the anode 31 through the pixel opening, the cathode 34 is connected with the organic emitting layer 33, and the organic emitting layer 33 is driven by the anode 31 and the cathode 34 to emit light of a corresponding color. The encapsulation layer may include a first encapsulation layer 41, a second encapsulation layer 42, and a third encapsulation layer 43 which are stacked. For example, the first encapsulation layer 41 and the third encapsulation layer 43 may be made of an inorganic material, the second encapsulation layer 42 may be made of an organic material, and the second encapsulation layer 42 is disposed between the first encapsulation layer 41 and the third encapsulation layer 43, which may ensure that external water vapor cannot enter the light emitting structure layer 13.

In an exemplary embodiment, the drive circuit layer of each sub-pixel may include a first insulation layer disposed on a flexible base substrate, an active layer disposed on the first insulation layer, a second insulation layer covering the active layer, a gate electrode and a first capacitor electrode disposed on the second insulation layer, a third insulation layer covering the gate electrode and the first capacitor electrode, a second capacitor electrode disposed on the third insulation layer, and a fourth insulation layer covering the second capacitor electrode, wherein a via is disposed on the fourth insulation layer and the via exposes the active layer, and a source electrode and a drain electrode disposed on the fourth insulation layer, the source electrode and the drain electrode are respectively connected with the active layer through the via, and a planarization layer covering the aforementioned structure. The active layer, the gate electrode, the source electrode, and the drain electrode form a transistor, and the first capacitor electrode and the second capacitor electrode form a storage capacitor. In an exemplary embodiment, the active layer may be made of a material, such as amorphous Indium Gallium Zinc Oxide (a-IGZO), Zinc Oxynitride (ZnON), Indium Zinc Tin Oxide (IZTO), amorphous Silicon (a-Si), polycrystalline Silicon (p-Si), hexathiophene, or polythiophene, and the present disclosure is applicable to transistors prepared based on an oxide technology, a silicon technology, or an organic matter technology.

In an exemplary embodiment, the organic emitting layer may include an Emitting Layer (EML) and any one or more of following layers: a Hole Injection Layer (HIL), a Hole Transport Layer (HTL), an Electron Block Layer (EBL), a Hole Block Layer (HBL), an Electron Transport Layer (ETL), and an Electron Injection Layer (EIL). For example, hole injection layers of all sub-pixels may be connected together to form a common layer, electron injection layers of all the sub-pixels may be connected together to form a common layer, hole transport layers of all the sub-pixels may be connected together to form a common layer, electron transport layers of all the sub-pixels may be connected together to form a common layer, hole block layers of all the sub-pixels may be connected together to form a common layer, emitting layers of adjacent sub-pixels may be overlapped slightly or may be isolated from each other, and electron block layers of adjacent sub-pixels may be overlapped slightly or may be isolated from each other.

In an exemplary embodiment, each sub-pixel in the display panel may include a light emitting region and a non-light emitting region. Since the organic emitting layer emits light from a region of the pixel opening defined by the pixel definition layer, the region of the pixel opening is a light emitting region FA of the sub-pixel, and a region outside the pixel opening is a non-light emitting region BF of the sub-pixel, wherein the non-light emitting region BF is located between light emitting regions FA of adjacent sub-pixels.

A bonding region will be described below with reference to the drawings.

Figure 4:
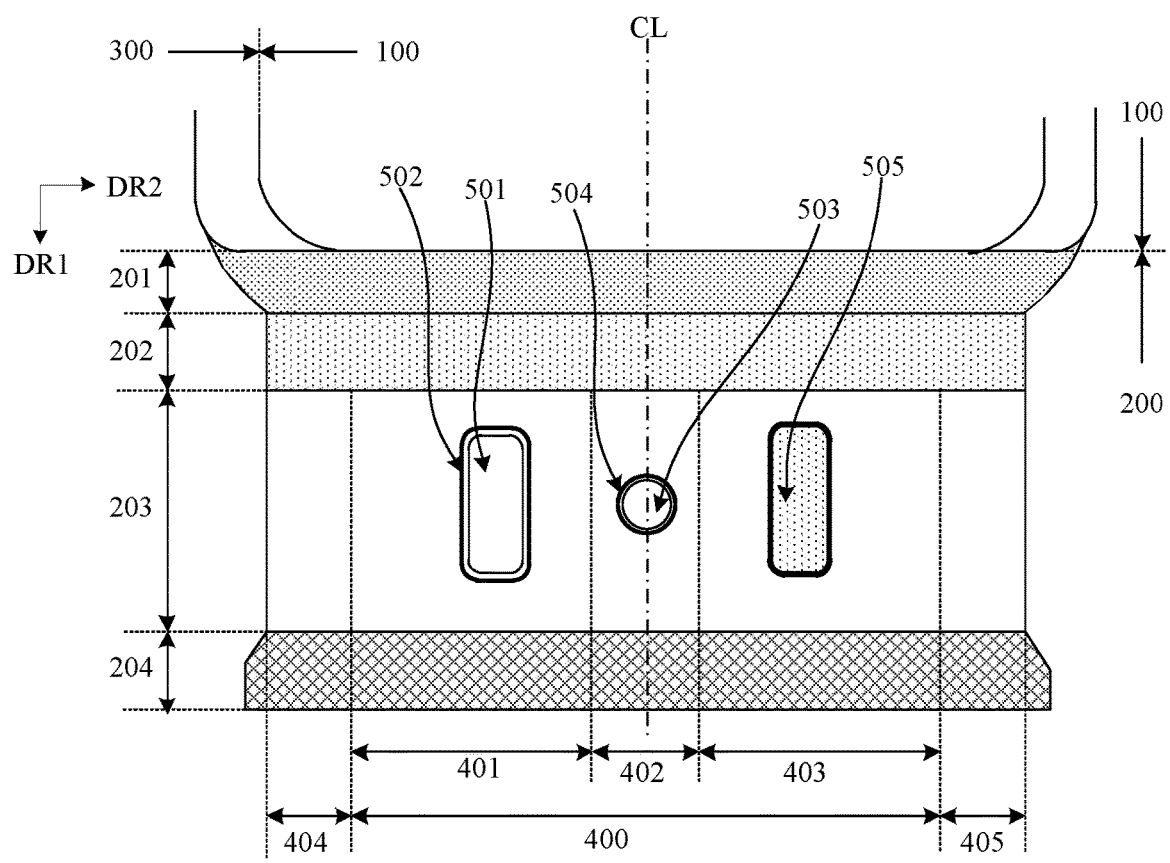
FIG. 4 is a schematic diagram of a structure of a bonding region in a display panel in an exemplary embodiment of the present disclosure.
Figure 5:
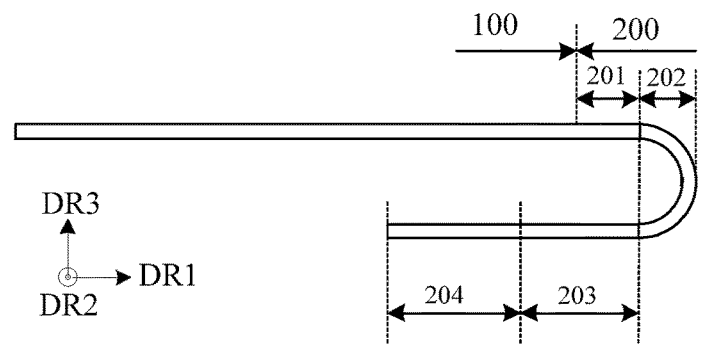
FIG. 5 is a side view of the display panel shown in FIG. 4.
Figure 6A:
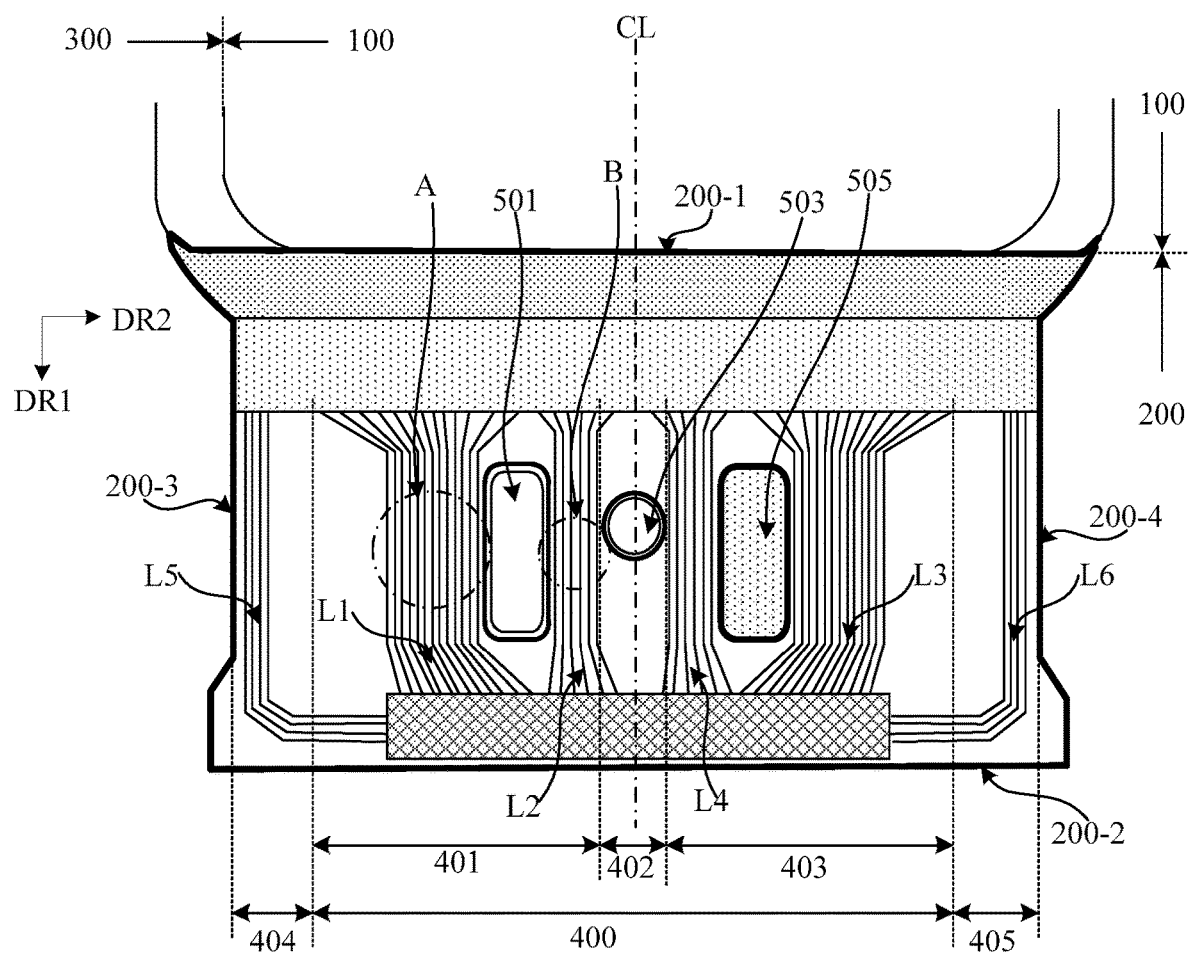
FIG. 6A is a schematic diagram of a wiring arrangement of a bonding region in the display panel shown in FIG. 4.
Figure 6B:
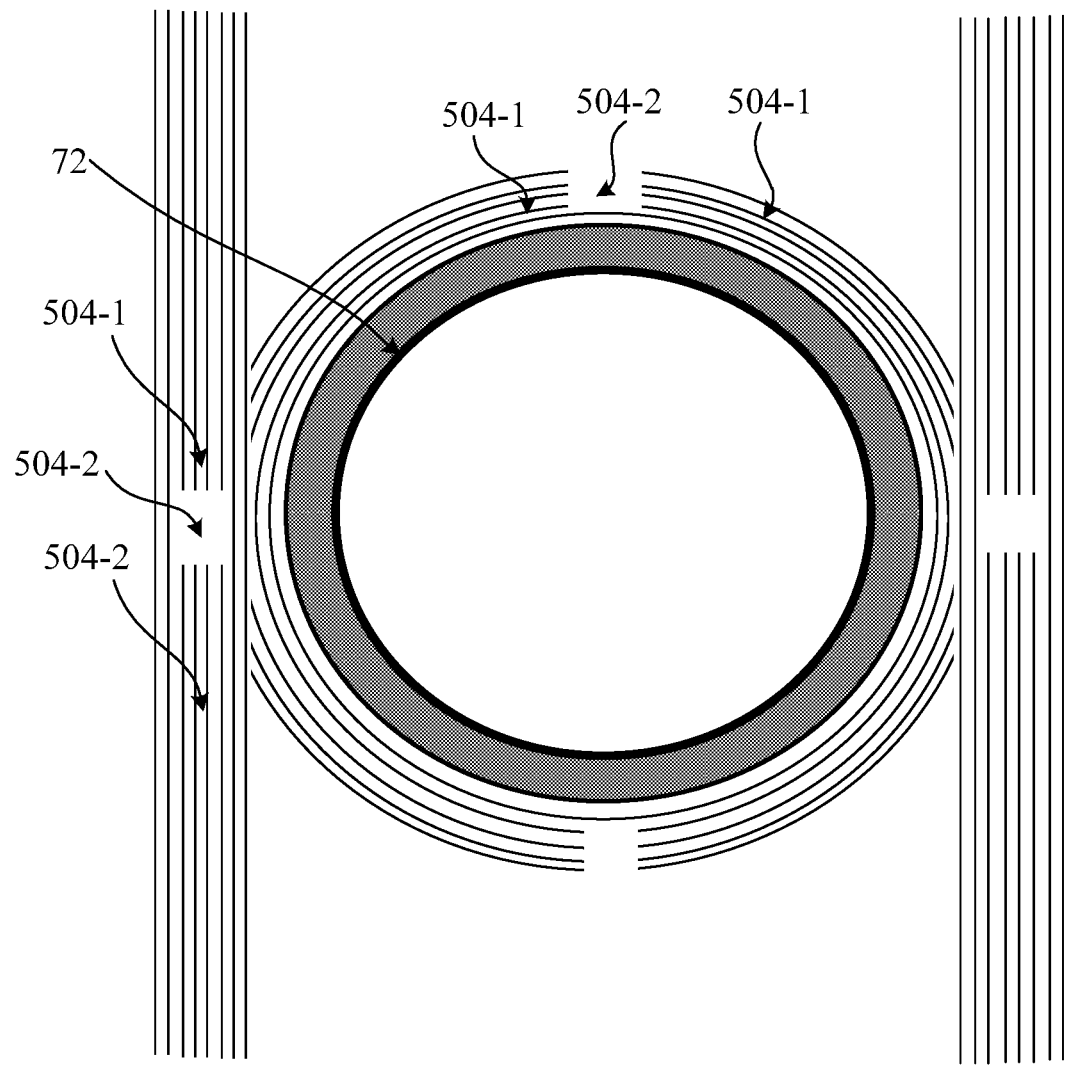
FIG. 6B is an enlarged schematic diagram of a first through hole in a display panel in an exemplary embodiment of the present disclosure.
Figure 6C:
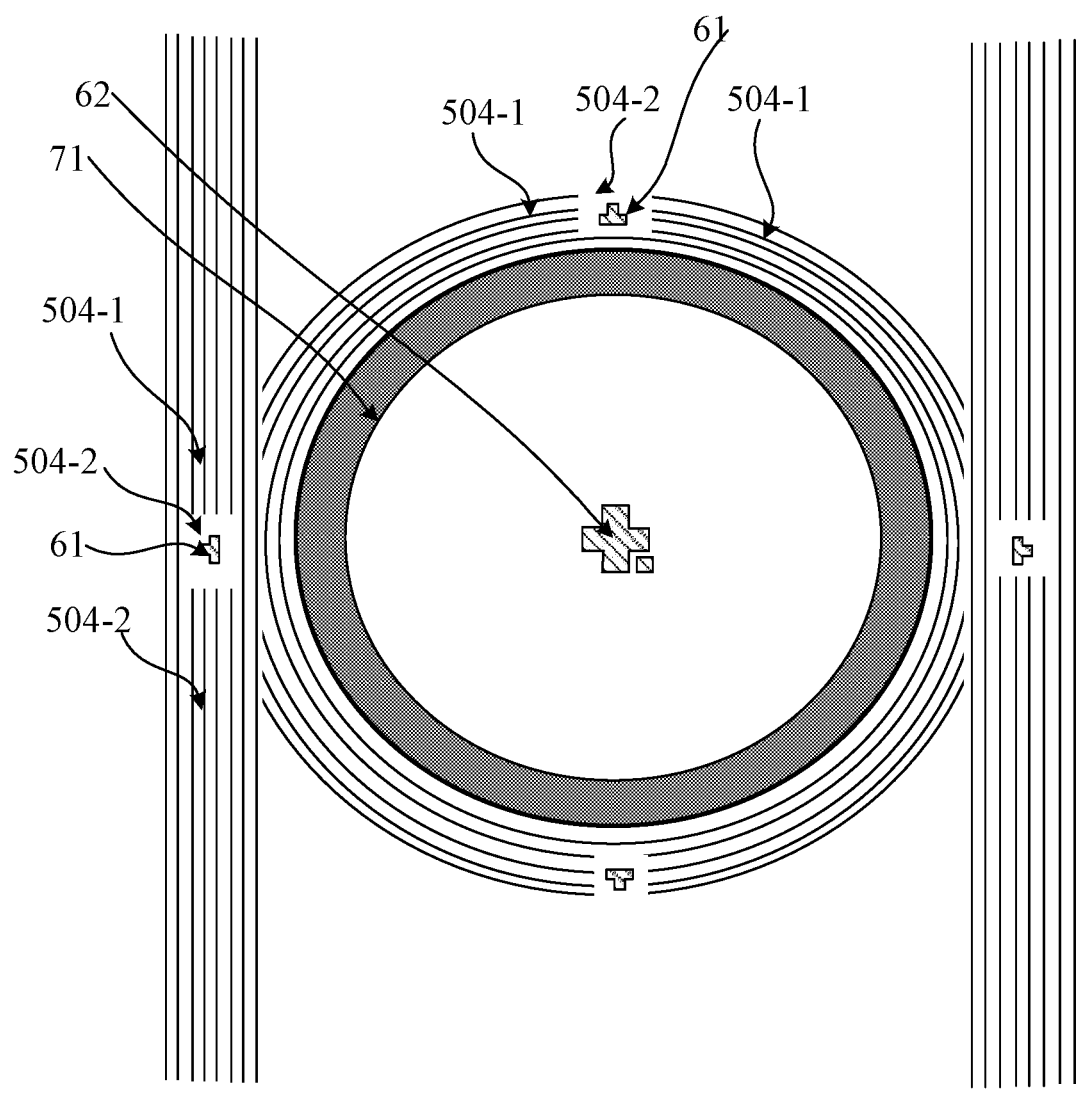
FIG. 6C is another enlarged schematic diagram of a first through hole in a display panel in an exemplary embodiment of the present disclosure.
Figure 6D:
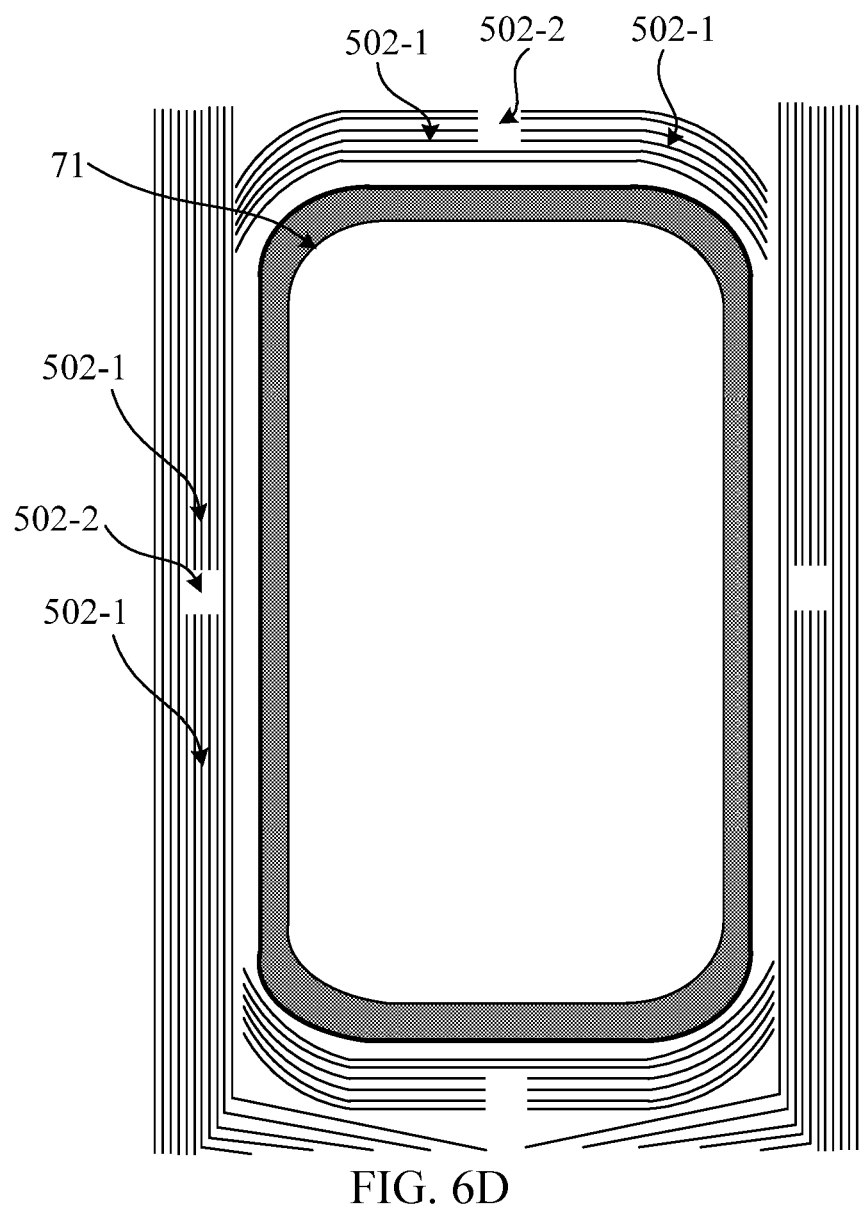
FIG. 6D is an enlarged schematic diagram of a second through hole in a display panel in an exemplary embodiment of the present disclosure.
Figure 6E:
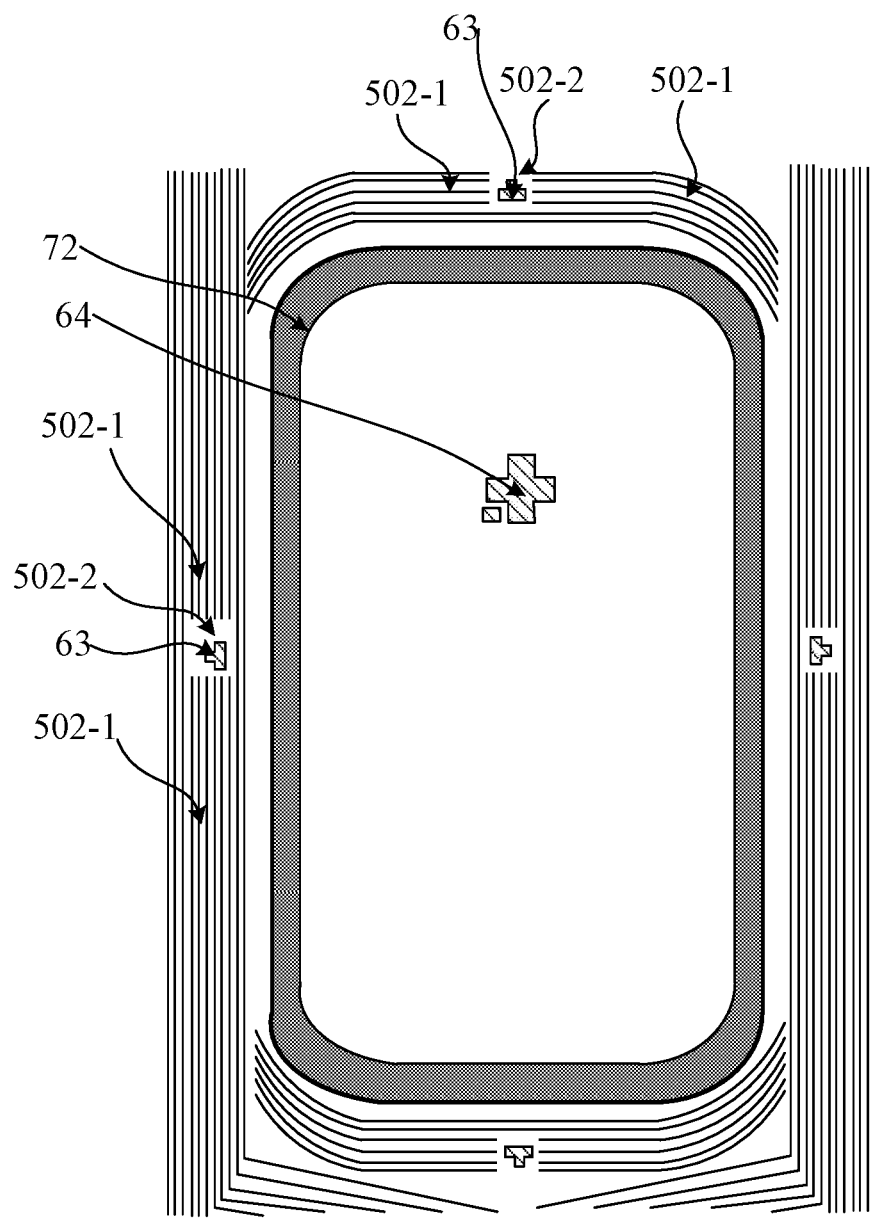
FIG. 6E is another enlarged schematic diagram of a second through hole in a display panel in an exemplary embodiment of the present disclosure.
Figure 7:
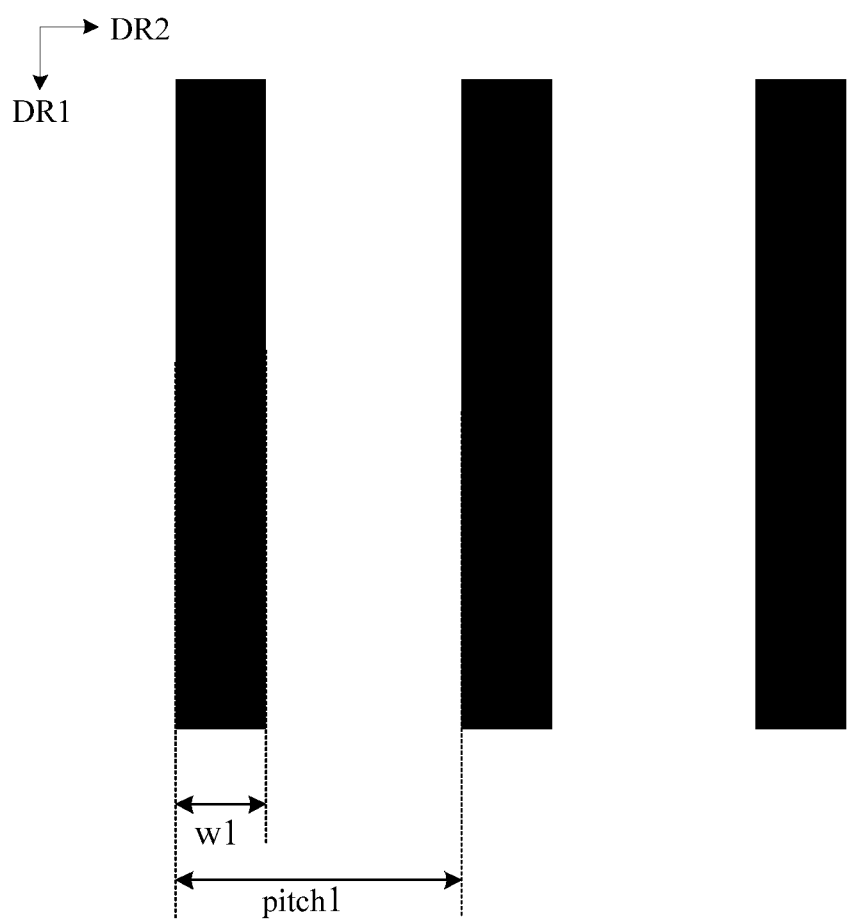
FIG. 7 is an enlarged schematic diagram of wirings in a region A in the bonding region shown in FIG. 6A.
Figure 8:
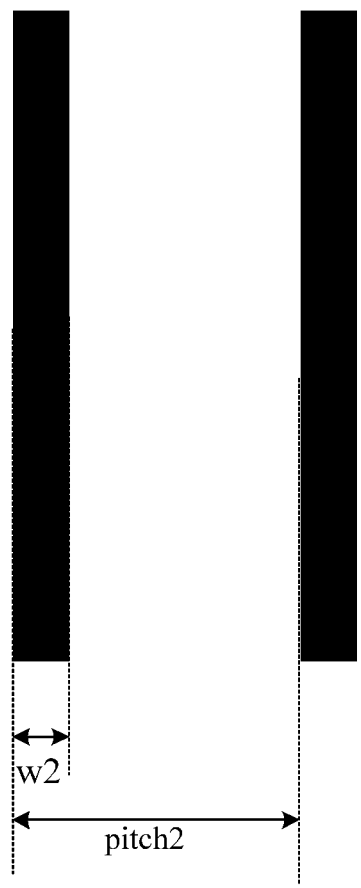
FIG. 8 is an enlarged schematic diagram of wirings in a region B in the bonding region shown in FIG. 6A.

FIG. 4 is a schematic diagram of a structure of a bonding region in a display panel in an exemplary embodiment of the present disclosure. FIG. 5 is a side view of the display panel shown in FIG. 4. FIG. 6A is a schematic diagram of a wiring arrangement of a bonding region in the display panel shown in FIG. 4. FIG. 6B is an enlarged schematic diagram of a first through hole in a display panel in an exemplary embodiment of the present disclosure. FIG. 6C is another enlarged schematic diagram of a first through hole in a display panel in an exemplary embodiment of the present disclosure. FIG. 6D is an enlarged schematic diagram of a second through hole in a display panel in an exemplary embodiment of the present disclosure. FIG. 6E is another enlarged schematic diagram of a second through hole in a display panel in an exemplary embodiment of the present disclosure. FIG. 7 is an enlarged schematic diagram of wirings in a region A in the bonding region shown in FIG. 6A. FIG. 8 is an enlarged schematic diagram of wirings in a region B in the bonding region shown in FIG. 6A. Here, wirings in FIG. 6A to FIG. 8 are merely illustrative, and a quantity of wirings does not represent an actual quantity. Here, in FIG. 4 to FIG. 8, a case that a first through hole is selected as a circle and a second through hole is selected as a rounded rectangle is taken as an example for illustration, and a shape of a through hole does not represent an actual shape.

In an exemplary embodiment, as shown in FIG. 4 and FIG. 5, a bonding region 200 may include: multiple data line leads (not shown in the figure) connected with multiple data lines (not shown in the figure) and multiple pins (not shown in the figure) connected with the multiple data line leads (not shown in the figure), wherein the multiple pins are located on one side of the multiple data line leads (not shown in the figure) away from a display region 100. In a plane parallel to the display panel, the bonding region 200 may further include: a first wiring region 201, a bending region 202, a second wiring region 203, and a composite circuit region 204 disposed in sequence along a first direction DR1 (i.e., a direction away from the display region 100). Herein, the first wiring region 201 is connected to the display region 100, the bending region 202 is connected to the first wiring region 201, the second wiring region 203 is connected to the bending region 202, and the composite circuit region 503 is connected to the second wiring region 203.

In an exemplary embodiment, the first wiring region may include multiple leading out lines, for example, the multiple leading out lines may include multiple data line leads, multiple touch leads, a first power supply connection line, or a second power supply connection line, etc. For example, the multiple data line leads are configured to connect data signal lines (also referred to as data lines) of the display region in a fanout wiring mode. For example, multiple scan connection lines are configured to connect scan signal lines of the display region in a fanout wiring mode. For example, multiple touch leads are configured to connect touch signal lines (e.g., a touch drive signal TX line and a touch sensing signal RX line) in a frame region in a fanout wiring mode, and the touch signal lines are configured to connect touch electrodes of the display region. For example, the first power supply connection line is configured to connect a first power supply line (VDD) of the display region that may provide a high voltage, and the second power supply connection line is configured to connect a second power supply line (VSS) of the frame region that may provide a low voltage. Here, no limit is made thereto in the embodiment of the present disclosure.

In an exemplary embodiment, as shown in FIG. 5, the bending region 202 may include a composite insulation layer provided with a groove, wherein the composite insulation layer is configured to enable that a part of the bonding region 200 may be bent to a back of the display region 100. For example, as shown in FIG. 5, the bending region may be bent with a curvature in a third direction D3, and surfaces of the second wiring region 203 and the composite circuit region 204 may be reversed, i.e. an upward facing surface of the second wiring region 203 and an upward facing surface of the composite circuit region 204 may be converted to face downward through bending of the bending region 202, wherein the third direction DR3 intersects with the first direction DR1. For example, when the bending region 202 is bent, the second wiring region 203 and the composite circuit region 204 may be overlapped with the display region 100 in the third direction DR3 (i.e., a thickness direction of the display panel).

In an exemplary embodiment, the composite circuit region may include an anti-static region, an Integrated Circuit (IC) region, and a bonding electrode region disposed in sequence along the first direction DR1 (i.e., a direction away from the display region 100). For example, the anti-static region may include an anti-static circuit, configured to prevent an electrostatic damage to a display substrate by eliminating static electricity. For example, the integrated circuit region may be provided with a Touch and Display Driver Integration (TDDI) circuit, configured to be connected with the multiple data line leads. For example, the bonding electrode region may include multiple bonding pads, configured to be bonded and connected with an external Flexible Printed Circuit (FPC). Here, no limit is made thereto in the embodiment of the present disclosure.

In an exemplary embodiment, the second wiring region may include multiple data line leads drawn out in a fanout wiring mode, or multiple touch leads drawn out in a fanout wiring mode, etc. Here, no limit is made thereto in the embodiment of the present disclosure.

In an exemplary embodiment, as shown in FIG. 4 and FIG. 6A, the second wiring region 203 may include: a first sub-region 400, and a second sub-region 404 and a third sub-region 405 located on two sides of the first sub-region 400 in the second direction DR2. The second wiring region 203 may have a center line CL extending along the first direction DR1. For example, the second sub-region 404 and the third sub-region 405 may be disposed symmetrically with respect to the center line CL. Here, the center line CL may be a straight line extending along the first direction DR1 and equally dividing the second wiring region 203 (or the bonding region 100). The second direction DR2 intersects with the first direction DR1. Herein, in FIG. 4, a case that the second sub-region 404, the first sub-region 400, and the third sub-region 405 are disposed in sequence along the second direction DR2 is taken as an example for illustration. Here, no limit is made thereto in the embodiment of the present disclosure.

In an exemplary embodiment, as shown in FIG. 4 and FIG. 6A, the first sub-region 400 may include a second hole region 402, and a first hole region 401 and a third hole region 403 located on two sides of the second hole region 402 in the second direction DR2. The second wiring region 203 may have a center line CL extending along the first direction DR1. The first hole region 401 is provided with a second through hole 501, the second hole region 402 is provided with a first through hole 503, and the third hole region 403 is provided with a dummy hole 505, wherein the first through hole 503 may be disposed symmetrically with respect to the center line CL. Here, the center line CL may be a straight line extending along the first direction DR1 and equally dividing the second wiring region 203 (or the bonding region 100). The second direction DR2 intersects with the first direction DR1. Herein, in FIG. 4, a case that the first hole region 401, the second hole region 402, and the third hole region 403 are disposed in sequence along the second direction DR2 is taken as an example for illustration. Here, no limit is made thereto in the embodiment of the present disclosure.

In an exemplary embodiment, the first through hole 503 may be a hole penetrating a film layer.

In an exemplary embodiment, the second through hole 501 may be a hole penetrating a film layer.

In an exemplary embodiment, the dummy hole 505 may not penetrate any film layer, or the dummy hole may be a hole penetrating a film layer. Here, no limit is made thereto in the embodiment of the present disclosure.

In an exemplary embodiment, a shape of the dummy hole may be the same as a shape of the second through hole, and a size of the second through hole may be the same as a size of the dummy hole. For example, the second through hole 501 and the dummy hole 505 may be disposed symmetrically with respect to the center line CL. Here, a size may include one or more of a feature size of the second through hole in the first direction DR1, or a feature size of the second through hole in the second direction DR2.

In an exemplary embodiment, the first hole region may have a function of avoiding the second photosensitive element.

In an exemplary embodiment, a position of the second through hole may correspond to a position of the second photosensitive element. Thus, by opening the second through hole in the first hole region in the bonding region, avoiding the second photosensitive element may be implemented. For example, the second photosensitive element may be a fingerprint recognition component, a camera component (e.g., Multi-level Diffractive Lens (MDL)), or an infrared sensor, etc. Here, no limit is made thereto in the embodiment of the present disclosure.

In an exemplary embodiment, in a plane parallel to the display panel, a shape of the second through hole and a shape of the dummy hole may be selected from any one of a rectangle, a rounded rectangle, an ellipse, a polygon, or a circle. For example, as shown in FIG. 4 and FIG. 6A, the shape of the second through hole 501 and the shape of the dummy hole 505 may be rounded rectangles. Here, no limit is made thereto in the embodiment of the present disclosure.

For example, taking the shape of the second through hole and the shape of the dummy hole being both rounded rectangles as an example, a size of a rounded rectangle may include a length (for example, a feature size of the rounded rectangle in the first direction DR1) of the rounded rectangle and a width (for example, a feature size of the rounded rectangle in the second direction DR2) of the rounded rectangle. For example, taking the shape of the second through hole and the shape of the dummy hole being both circles as an example, a size of a circle may include a diameter (for example, a feature size of the circle in the first direction DR1 or the second direction DR2) of the circle. For example, taking the shape of the second through hole and the shape of the dummy hole being both ellipses as an example, a size of an ellipse may include a long axis of the ellipse (for example, a feature size of the ellipse in the first direction DR1) and a short axis (for example, a feature size of the ellipse in the second direction DR2) of the ellipse.

In an exemplary embodiment, as shown in FIG. 4 and FIG. 6A, taking the shape of the second through hole 501 and the shape of the dummy hole 505 being rounded rectangles as an example, a length of a rounded rectangle in the first direction DR1 may be about 2 mm to 15 mm, and a width of the rounded rectangle in the second direction DR2 may be about 2 mm to 5 mm. For example, the length of the rounded rectangle in the first direction may be about 7.3 mm, or 10 mm, etc. For example, the width of the rounded rectangle in the second direction may be about 3 mm, or 4.2 mm, etc. Here, a length may refer to a feature size in the first direction DR1, and a width may refer to a feature size in the second direction DR2. Here, no limit is made thereto in the embodiment of the present disclosure.

In an exemplary embodiment, taking the shape of the second through hole 501 and the shape of the dummy hole 505 being circles as examples, a diameter of a circle may be about 2 mm to 5 mm. For example, the diameter of the circle may be about 3 mm, or 3.6 mm, etc. Here, no limit is made thereto in the embodiment of the present disclosure.

In an exemplary embodiment, the second hole region may have a function of avoiding the first photosensitive element.

In an exemplary embodiment, a position of the first through hole may correspond to a position of the first photosensitive element. Thus, by opening the first through hole in the bonding region, avoiding the first photosensitive element may be implemented. For example, the first photosensitive element may be a fingerprint recognition component, a camera component, or an infrared sensor, etc. Here, no limit is made thereto in the embodiment of the present disclosure.

In an exemplary embodiment, in a plane parallel to the display panel, a shape of the first through hole and a shape of the second through hole may be selected from any one or more of a circle, a rectangle, a rounded rectangle, an ellipse, or a polygon.

In an exemplary embodiment, in a plane parallel to the display panel, a shape of the first through hole may be selected from any one of a circle, a rectangle, a rounded rectangle, an ellipse, or a polygon. For example, as shown in FIG. 4 and FIG. 6A, a shape of the first through hole 503 may be a circle.

In an exemplary embodiment, taking the shape of the first through hole being a circle as an example, a diameter of the circle may be about 2 mm to 5 mm. For example, the diameter of the circle may be about 3 mm or 3.6 mm, etc. Here, no limit is made thereto in the embodiment of the present disclosure.

In an exemplary embodiment, the first hole region may further have a function of configuring a wiring, wherein the wiring is connected with a leading out line in the first wiring region.

In an exemplary embodiment, as shown in FIG. 6A to FIG. 8, the first hole region 401 may further include: multiple first wirings L1 extending along the first direction DR1 and multiple second wirings L2 extending along the first direction DR1 located on two sides of the second through hole 501 in the second direction DR2, wherein a length of a first wiring L1 is larger than a length of a second wiring L2, and a width w1 of the first wiring L1 is larger than a width w2 of the second wiring L2. Herein, a width of a wiring may refer to a feature size in the second direction DR2, and a length of the wiring may refer to a feature size in the first direction DR1. Thus, by setting a width of relatively long wirings (e.g., the first wirings L1) among wirings on two sides of the second through hole to be relatively wide, and setting a width of relatively short wirings (e.g., the second wirings L2) to be relatively thin, an overall resistance of the relatively long wirings (e.g., the first wirings L1) may be reduced, so that loading of the relatively long wirings (e.g., the first wirings L1) may be reduced, ensuring that resistances of the wirings on two sides of the second through hole vary uniformly and loading is relatively balanced.

In an exemplary embodiment, as shown in FIG. 6A to FIG. 8, the width w1 of the first wiring L1 may be about 4.5 microns to 6.5 microns, and the width w2 of the second wiring L2 may be about 2.5 microns to 4.4 microns. For example, the width w1 of the first wiring L1 may be about 5.4 microns, and the width w2 of the second wiring L2 may be about 3.4 microns. Herein, a width of a wiring may refer to a feature size in the second direction. Here, no limit is made thereto in the embodiment of the present disclosure.

In an exemplary embodiment, as shown in FIG. 6A to FIG. 8, a pitch pitch1 between adjacent first wirings L1 and a pitch pitch2 between adjacent second wirings L2 may be the same in the second direction DR2. Herein, a pitch (also referred to as a center distance) between adjacent wirings may refer to a distance between center points of two adjacent wirings in the second direction DR2, or may refer to a distance between same sides of two adjacent wirings in the second direction DR2.

In an exemplary embodiment, as shown in FIG. 6A to FIG. 8, in the second direction DR2, at least one of the pitch pitch1 between adjacent first wirings L1 and the pitch pitch2 between adjacent second wirings L2 may be about 16 microns to 20 microns. For example, the pitch pitch1 between adjacent first wirings L1 and the pitch pitch2 between adjacent second wirings L2 may both be 18 microns. Here, no limit is made thereto in the embodiment of the present disclosure.

In an exemplary embodiment, the first wirings L1 and the second wirings L2 may be multiple data line leads drawn out in a fanout wiring mode, or multiple touch leads drawn out in a fanout wiring mode, etc. Here, no limit is made thereto in the embodiment of the present disclosure.

In an exemplary embodiment, the third hole region may further have a function of configuring a wiring, wherein the wiring is connected with a leading out line in the first wiring region.

In an exemplary embodiment, as shown in FIG. 6A, the third hole region 403 may further include: multiple third wirings L3 extending along the first direction DR1 and multiple fourth wirings L4 extending along the first direction DR1 located on two sides of the dummy hole 505 in the second direction DR2, wherein a length of a third wiring L3 is larger than a length of a fourth wiring L4, a width of the third wiring L3 is larger than a width of the fourth wiring L4, the third wirings L3 and the first wirings L1 may be disposed symmetrically with respect to a center line CL, and the fourth wirings L4 and the second wirings L2 may be disposed symmetrically with respect to the center line CL. Herein, a width of a wiring may refer to a feature size in the second direction DR2, and a length of the wiring may refer to a feature size in the first direction DR1. Thus, by setting a width of relatively long wirings (e.g., the third wirings L3) among wirings on two sides of the dummy hole to be relatively wide, and setting a width of relatively short wirings (e.g., the fourth wirings L4) to be relatively thin, an overall resistance of the relatively long wirings (e.g., the third wirings L3) may be reduced, so that loading of the relatively long wirings (e.g., the third wirings L3) may be reduced, ensuring that resistances of the wirings on two sides of the dummy hole vary uniformly and loading is relatively balanced. Moreover, since the third wirings L3 and the first wirings L1 are symmetrically disposed with respect to the center line CL, and the fourth wirings L4 and the second wirings L2 are symmetrically disposed with respect to the center line CL, it may be ensured that resistances of wirings in the second wiring region vary uniformly.

In an exemplary embodiment, the width of the third wiring L3 may be the same as the width of the first wiring L1, for example, the width of the third wiring L3 may be about 4.5 microns to 6.5 microns. For example, the width of the third wiring L3 may be about 5.4 microns. Herein, a width of a wiring may refer to a feature size in the second direction. Here, no limit is made thereto in the embodiment of the present disclosure.

In an exemplary embodiment, the width of the fourth wiring L4 may be the same as the width of the second wiring L2. For example, the width of the fourth wiring L4 may be about 2.5 microns to 4.4 microns. For example, the width of the fourth wiring L4 may be about 3.4 microns. Herein, a width of a wiring may refer to a feature size in the second direction. Here, no limit is made thereto in the embodiment of the present disclosure.

In an exemplary embodiment, a pitch between adjacent third wirings L3 may be the same as a pitch between adjacent first wirings L1. A pitch between adjacent fourth wirings L4 and a pitch between adjacent second wirings L2 may be the same. Herein, a pitch (also referred to as a center distance) between adjacent wirings may refer to a distance between center points of two adjacent wirings in the second direction DR2, or may refer to a distance between same sides of two adjacent wirings in the second direction DR2.

In an exemplary embodiment, in the second direction DR2, at least one of the pitch between adjacent third wirings L3 and the pitch between adjacent fourth wirings L4 may be about 16 microns to 20 microns. For example, the pitch between adjacent third wirings L3 and the pitch between adjacent fourth wirings L4 may both be 18 microns. Here, no limit is made thereto in the embodiment of the present disclosure.

In an exemplary embodiment, the third wirings L3 and the four wirings L4 may be multiple data line leads drawn out in a fanout wiring mode, or multiple touch leads drawn out in a fanout wiring mode, etc. Here, no limit is made thereto in the embodiment of the present disclosure.

In an exemplary embodiment, as shown in FIG. 6A, the second sub-region 404 may include a fifth wiring L5 extending along the first direction DR1, and the third sub-region 405 may include a sixth wiring L6 extending along the first direction DR1, wherein the fifth wiring L5 and the sixth wiring L6 may be disposed symmetrically with respect to the center line CL.

In an exemplary embodiment, a width of the sixth wiring L6 may be the same as a width of the fifth wiring L5. For example, the width of the sixth wiring L6 and the width of the fifth wiring L5 may be about 2 microns to 7 microns. For example, the width of the sixth wiring L6 and the width of the fifth wiring L5 may be about 5.4 microns. Here, no limit is made thereto in the embodiment of the present disclosure.

In an exemplary embodiment, a pitch between adjacent sixth wirings L6 and a pitch between adjacent fifth wirings L5 may be the same. For example, in the second direction DR2, at least one of the pitch between adjacent sixth wirings L6 and the pitch between adjacent fifth wirings L5 may be about 16 microns to 20 microns. For example, the pitch between adjacent sixth wirings L6 and the pitch between adjacent fifth wirings L5 may both be 18 microns. Herein, a pitch (also referred to as a center distance) between adjacent wirings may refer to a distance between center points of two adjacent wirings in the second direction DR2, or may refer to a distance between same sides of two adjacent wirings in the second direction DR2. Here, no limit is made thereto in the embodiment of the present disclosure.

In an exemplary embodiment, as shown in FIG. 4, the display panel may further include a dummy wiring, wherein the dummy wiring may include at least one of a second dummy wiring 502 located in the first hole region 401 and around the second through hole 501, and a first dummy wiring 504 located in the second hole region 402 and around the first through hole 503. Thus, by setting a dummy wiring around a through hole, a risk of a bad crack around the through hole may be reduced during a punching process in a process of preparing the display panel, an adverse effect on a normal wiring around the through hole may be avoided, and a product yield may be improved. Here, no limit is made thereto in the embodiment of the present disclosure.

For example, when the dummy hole does not penetrate any film layer, a third dummy wiring may be disposed around the dummy hole. Or, when the dummy hole may be a hole penetrating a film layer, a third dummy wiring may not be disposed around the dummy hole. Or, when the dummy hole may be a hole penetrating a film layer, a third dummy wiring may be disposed around the dummy hole. Thus a risk of a bad crack around the dummy hole may be reduced during a punching process, an adverse effect on a normal wiring around the through hole may be avoided, and a product yield may be improved. Here, no limit is made thereto in the embodiment of the present disclosure.

In an exemplary embodiment, as shown in FIG. 4, a shape of the first dummy wiring 504 and a shape of the first through hole 503 may be the same. Here, no limit is made thereto in the embodiment of the present disclosure.

In an exemplary embodiment, as shown in FIG. 4, a shape of the second dummy wiring 502 and a shape of the second through hole 501 may be the same. Here, no limit is made thereto in the embodiment of the present disclosure.

In an exemplary embodiment, the dummy wiring may include one or more of a continuous closed wiring and a discontinuous unclosed wiring. For example, taking the dummy wiring including the discontinuous unclosed wiring as an example, the dummy wiring may include multiple dummy wiring segments and a discontinuous portion located between two adjacent dummy wiring segments. Here, no limit is made thereto in the embodiment of the present disclosure.

In an exemplary embodiment, as shown in FIG. 4, the first dummy wiring 504 may be a continuous wiring. Or, as shown in FIG. 6B and FIG. 6C, the first dummy wiring 504 may be a discontinuous wiring, and the first dummy wiring 504 may include multiple first dummy wiring segments 504-1 and a first discontinuous portion 504-2 located between two adjacent first dummy wiring segments 504-1. Herein, in FIG. 6B and FIG. 6C, eight first dummy wiring segments 504-1 and four first discontinuous portions 504-2 in the first dummy wiring 504 are taken as an example, and do not represent an actual quantity of first dummy wiring segments and an actual quantity of first discontinuous portions. In addition, in FIG. 6B and FIG. 6C, a case that the first dummy wiring 504 includes a combination of a continuous closed dummy wiring and a discontinuous dummy wiring is taken as an example for illustration. Here, no limit is made thereto in the embodiment of the present disclosure.

In an exemplary embodiment, as shown in FIG. 6C, the first discontinuous portion 504-2 may include a first sub-mark structure 61. For example, the first sub-mark structure 61 may include, but is not limited to, any one or more of an inverted "T"-shaped structure, a rectangular structure, or a cross-shaped structure. Here, no limit is made thereto in the embodiment of the present disclosure.

In an exemplary embodiment, as shown in FIG. 6C, the first through hole 503 may include a second sub-mark structure 62. For example, the second sub-mark structure 62 may include, but is not limited to, any one or more of an inverted "T"-shaped structure, a rectangular structure, or a cross-shaped structure. Here, no limit is made thereto in the embodiment of the present disclosure.

In an exemplary embodiment, as shown in FIG. 6B and FIG. 6C, a first cutting line 71 may be disposed on an outer side of the second sub-mark structure, wherein a shape of the first cutting line 71 is the same as a contour of the first through hole 503. After a film layer process of a display motherboard is completed, a cutting device cuts the display motherboard along the first cutting line 71, which may form first through holes 503 in multiple display panels.

In an exemplary embodiment, as shown in FIG. 4, the second dummy wiring 502 may be a continuous wiring. Or, as shown in FIG. 6D and FIG. 6E, the second dummy wiring 502 may be a discontinuous wiring, and the second dummy wiring 502 may include: multiple second dummy wiring segments 502-1 and a second discontinuous portion 502-2 located between two adjacent second dummy wiring segments 502-1. Herein, in FIG. 6D and FIG. 6E, eight second dummy wiring segments 502-1 and four second discontinuous portions 502-2 in the second dummy wiring 502 are as an example, and do not represent an actual quantity of second dummy wiring segments and an actual quantity of second discontinuous portion. In addition, in FIG. 6D and FIG. 6E, a case that the second dummy wiring 502 includes a combination of a continuous closed dummy wiring and a discontinuous dummy wiring is taken as an example for illustration. Here, no limit is made thereto in the embodiment of the present disclosure.

In an exemplary embodiment, as shown in FIG. 6E, the second discontinuous portion 502-2 may include a third sub-mark structure 63. For example, the third sub-mark structure 63 may include, but is not limited to, any one or more of an inverted "T"-shaped structure, a rectangular structure, or a cross-shaped structure. Here, no limit is made thereto in the embodiment of the present disclosure.

In an exemplary embodiment, as shown in FIG. 6E, the second through hole 501 may include a fourth sub-mark structure 64. For example, the fourth sub-mark structure 64 may include, but is not limited to, any one or more of an inverted "T"-shaped structure, a rectangular structure, or a cross-shaped structure. Here, no limit is made thereto in the embodiment of the present disclosure.

In an exemplary embodiment, as shown in FIG. 6D and FIG. 6E, a second cutting line 72 may be disposed on an outer side of the fourth sub-mark structure 64, wherein a shape of the second cutting line 72 is the same as a contour of the second through hole 501. After a film layer process of a display motherboard is completed, a cutting device cuts the display motherboard along the second cutting line 72, which may form second through holes 501 in multiple display panels.

In an exemplary embodiment, a width of the second dummy wiring 502 may be the same as a width of the first dummy wiring 504. Herein, a width of a wiring may refer to a feature size in the second direction DR2.

In an exemplary embodiment, a width of the second dummy wiring 502 and a width of the first dummy wiring 504 may be about 3 microns to 8 microns. For example, the width of the second dummy wiring 502 and the width of the first dummy wiring 504 may be about 5.4 microns. Here, no limit is made thereto in the embodiment of the present disclosure.

In an exemplary embodiment, a bonding region may be an abnormity bonding region. Here, the abnormity bonding region may refer to a bonding region other than a bonding region with a regular shape (e.g., a rectangular bonding region).

In an exemplary embodiment, as shown in FIG. 6A, in a plane parallel to the display panel, a contour shape of the bonding region 200 may include a first edge 200-1 (for example, as an upper edge), a second edge 200-2 (for example, as a lower edge disposed opposite to the upper edge), a third edge 200-3 (for example, as a left edge), and a fourth edge 200-4 (for example, as a right edge disposed opposite to the left edge) constituting an abnormity.

In an exemplary embodiment, as shown in FIG. 6A, the first edge 200-1 may extend along the second direction DR2 and be located on one side close to the display region 100; the second edge 200-2 may extend along the second direction DR2 and be located on one side of the first edge 200-1 away from the display region 100; the third edge 200-3 may extend along the first direction DR1, and the third edge 200-3 may include a curved extending first part and a vertically extending second part disposed in sequence along the first direction DR1, wherein a first end of the first part is bent toward an opposite direction of the second direction DR2 and connected with a first end of the first edge 200-1, a second end of the first part is bent toward the opposite direction of the second direction DR2 and connected with a first end of the second part, and a second end of the second part is connected with a first end of the second edge 200-2; the fourth edge 200-4 may extend along the first direction DR1, and the fourth edge 200-4 may include a curved extending third part and a vertically extending fourth part disposed in sequence along the first direction DR1, wherein a first end of the third part is bent toward the second direction DR2 and connected with a second end of the first edge 200-1, a second end of the third part is bent toward the second direction DR2 and connected with a first end of the fourth part, and a second end of the fourth part is connected with a second end of the second edge 200-2. The first direction DR1 intersects with the second direction DR2. Here, in FIG. 6A, a case that a lower edge (i.e. an edge located on a side close to the bonding region 200) of the display region 100 may coincide with an upper edge (i.e. the first edge 200-1 located on a side close to the display region 100) of the bonding region 200 is taken as an example for illustration.

An embodiment of the present disclosure also provides a display apparatus. The display apparatus may include the display panel and the first photosensitive element in one or more of the above exemplary embodiments, wherein a disposing position of the first photosensitive element corresponds to a disposing position of the first through hole.

In an exemplary embodiment, the display apparatus may further include the second photosensitive element, and the second wiring region further includes the second through hole, located on one side of the second direction of the first through hole, wherein a disposing position of the second photosensitive element corresponds to a disposing position of the second through hole.

Figure 9:
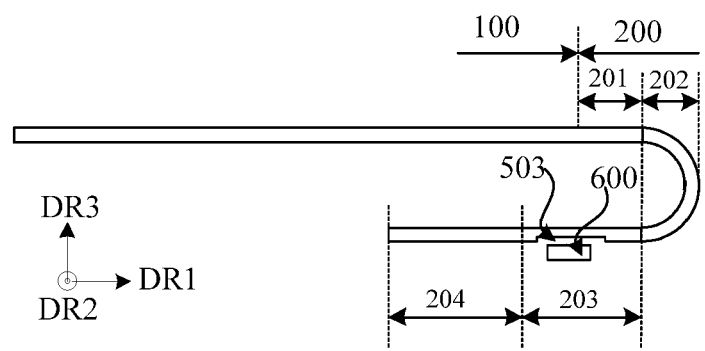
FIG. 9 is a schematic diagram of a structure of a display apparatus in an exemplary embodiment of the present disclosure.

FIG. 9 is a schematic diagram of a structure of a display apparatus in an exemplary embodiment of the present disclosure. As shown in FIG. 9, in an exemplary embodiment, the display apparatus may include a display panel, a first photosensitive element 600, and a second photosensitive element (not shown in the figure). Herein, the display panel may include a display region 100, and a bonding region 200 located on one side of the display region 100 in a first direction DR1. The bonding region 200 may include a first wiring region 201, a bending region 202, a second wiring region 203, and a composite circuit region 204 disposed in sequence along the first direction DR1 (i.e., a direction away from the display region 100). The second wiring region 203 may include a first sub-region, and a second sub-region (not shown in the figure) and a third sub-region (not shown in the figure) located on two sides of the first sub-region in a second direction DR2, wherein the first sub-region may include a second hole region, and a first hole region (not shown in the figure) and a third hole region (not shown in the figure) located on two sides of the second hole region in the second direction DR2, the first hole region is disposed with a second through hole (not shown in the figure), the second hole region is disposed with a first through hole 503, and the third hole region is disposed with a dummy hole (not shown in the figure). A disposing position of the first photosensitive element 600 may correspond to a disposing position of the first through hole 503, and a disposing position of the second photosensitive element may correspond to a disposing position of the second through hole. Thus, in the bonding region of the display panel, the first through hole is disposed symmetrically with respect to a center line, which may ensure uniformity of loading of wirings in the second wiring region, so that consistency of impedances of wirings on the display panel may be ensured, and a wiring pressure caused by a centralized distribution of wirings on one side may be avoided. Therefore, a display effect may be improved. However, a disposing position of a photosensitive element corresponds to a through hole in the bonding region, so that there is no need to open a hole in the display region, which is beneficial to achieving a full screen.

In an exemplary embodiment, the first photosensitive element may be a fingerprint recognition component, a camera component, or an infrared sensor, etc. For example, the first photosensitive element may include a camera component, for example, the camera component may be an MDL device. Here, no limit is made thereto in the embodiment of the present disclosure.

In an exemplary embodiment, the second photosensitive element may be a fingerprint recognition component, a camera component, or an infrared sensor, etc. For example, the second photosensitive element may include a fingerprint recognition component. For example, the fingerprint recognition component may be an optical fingerprint recognition component, or an ultrasonic fingerprint recognition component, etc. Here, no limit is made thereto in the embodiment of the present disclosure.

In an exemplary embodiment, the display apparatus may include, but is not limited to, an OLED display apparatus, or an Active-Matrix Organic Light Emitting Diode (AMO-LED) display apparatus, etc. Here, no limit is made thereto in the embodiment of the present disclosure.

In an exemplary embodiment, the display apparatus may include, but is not limited to, any product or component having a display function such as a mobile phone, a tablet computer, a television, a display, a notebook computer, a digital photo frame, or a navigator. Here, no limit is made thereto in the embodiment of the present disclosure.

The above descriptions of embodiments of the display apparatus are similar to the above descriptions of embodiments of the display panel, and the embodiments of the display apparatus have similar beneficial effects as the embodiments of the display panel. Technical details undisclosed in the embodiments of the display apparatus of the present disclosure may be understood by those skilled in the art with reference to the descriptions in the embodiments of the display panel of the present disclosure, which will not be repeated here.

Although implementation modes disclosed in the present disclosure are as above, the above contents are only implementation modes for easily understanding the present disclosure and not intended to limit the present disclosure. Any person skilled in the art to which the present disclosure pertains may make any modification and variation in forms and details of implementation without departing from the spirit and scope disclosed in the present disclosure. However, the scope of patent protection of the present disclosure is still subject to the scope defined by the appended claims.

The invention claimed is:

1. A display panel, comprising: a display region and a bonding region located on one side of the display region in a first direction; wherein the display region comprises a plurality of sub-pixels arranged in an array and a plurality of data lines electrically connected with the plurality of sub-pixels; the bonding region comprises a plurality of data line leads connected with the plurality of data lines and a plurality of pins connected with the plurality of data line leads, the plurality of pins are located on one side of the plurality of data line leads away from the display region; wherein, the bonding region further comprises a first wiring region, a bending region, and a second wiring region disposed in sequence along the first direction, wherein the second wiring region comprises a first through hole, the first through hole is located between the plurality of data line leads, and the first through hole is configured to correspond to a first photosensitive element;

wherein the second wiring region comprises a first sub-region and the first through hole is located in the first sub-region; the second wiring region has a center line extending along the first direction, and the first through hole is symmetrically disposed with respect to the center line;

wherein the second wiring region further comprises a second through hole, located on one side of the first through hole along a second direction, wherein the second through hole is configured to correspond to a second photosensitive element, and the second direction intersects with the first direction; and wherein the second wiring region further comprises a dummy hole, located on one side of the first through hole away from the second through hole along the second direction, and the first sub-region comprises a first hole region, a second hole region, and a third hole region arranged in sequence along the second direction, wherein the first through hole is located in the second hole region, the second through hole is located in the first hole region, and the dummy hole is located in the third hole region.

2. The display panel according to claim 1, wherein a shape of the dummy hole is the same as a shape of the second through hole, and a size of the second through hole is the same as a size of the dummy hole.

3. The display panel according to claim 2, wherein in a plane parallel to the display panel, the shape of the second through hole and the shape of the dummy hole are selected from any one of a rectangle, a rounded rectangle, an ellipse, a polygon, and a circle.

4. The display panel according to claim 3, wherein in the plane parallel to the display panel, the shape of the second through hole is a rounded rectangle, a length of the rounded rectangle in the first direction is 2 mm to 15 mm, and a width of the rounded rectangle in the second direction is 2 mm to 5 mm.

5. The display panel according to claim 1, wherein the first hole region further comprises a plurality of first wirings extending along the first direction and a plurality of second wirings extending along the first direction, the plurality of first wirings and the plurality of second wirings are respectively located on two sides of the second through hole along the second direction, a length of a first wiring is larger than a length of a second wiring, and a width of the first wiring is larger than a width of the second wiring.

6. The display panel according to claim 5, wherein in the second direction, a pitch between adjacent first wirings is the same as a pitch between adjacent second wirings.

7. The display panel according to claim 5, wherein the third hole region further comprises a plurality of third wirings extending along the first direction and a plurality of fourth wirings extending along the first direction, the plurality of third wirings and the plurality of fourth wirings are respectively located on two sides of the dummy hole, a length of a third wiring is larger than a length of a fourth wiring, a width of the third wiring is larger than a width of the fourth wiring, the third wirings and the first wirings are symmetrically disposed with respect to the center line, and the fourth wirings and the second wirings are symmetrically disposed with respect to the center line.

8. The display panel according to claim 1, wherein the second wiring region further comprises a dummy wiring, the dummy wiring comprises at least one of a first dummy wiring around the first through hole and a second dummy wiring around the second through hole.

9. The display panel according to claim 8, wherein a shape of the first dummy wiring is the same as a shape of the first through hole, and a shape of the second dummy wiring is the same as a shape of the second through hole.

10. The display panel according to claim 8, wherein a width of the first dummy wiring is the same as a width of the second dummy wiring.

11. The display panel according to claim 8, wherein the dummy wiring comprises a plurality of dummy wiring segments and a discontinuous portion located between two adjacent dummy wiring segments.

12. The display panel according to claim 1, wherein the second wiring region further comprises a second sub-region and a third sub-region located on both sides of the first sub-region along a second direction, the second sub-region and the third sub-region are symmetrically disposed with respect to the center line, and the second direction intersects with the first direction.

13. The display panel according to claim 12, wherein the second sub-region comprises a fifth wiring extending along the first direction, the third sub-region comprises a sixth wiring extending along the first direction, and the fifth wiring and the sixth wiring are disposed symmetrically with respect to the center line.

14. The display panel according to claim 13, wherein a width of the sixth wiring is the same as a width of the fifth wiring.

15. The display panel according to claim 1, wherein in a plane parallel to the display panel, a shape of the first through hole and a shape of the second through hole are selected from any one or more of a circle, a rectangle, a rounded rectangle, an ellipse, and a polygon.

16. A display apparatus, comprising: a display panel according to claim 1 and a first photosensitive element, wherein a disposing position of the first photosensitive element corresponds to a disposing position of a first through hole.

17. The display apparatus according to claim 16, further comprising: a second photosensitive element, wherein a second wiring region further comprises a second through hole, located on one side of the first through hole in a second direction, and a disposing position of the second photosensitive element corresponds to a disposing position of the second through hole.

* * * * *